(12) United States Patent
Oshima

(10) Patent No.: US 10,116,814 B2
(45) Date of Patent: Oct. 30, 2018

(54) ELECTRONIC APPARATUS AND DISPLAY CONTROL METHOD FOR ELECTRONIC APPARATUS

(71) Applicant: SEIKO EPSON CORPORATION, Tokyo (JP)

(72) Inventor: Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/867,686

(22) Filed: Sep. 28, 2015

(65) Prior Publication Data

US 2016/0105575 A1 Apr. 14, 2016

(30) Foreign Application Priority Data

Oct. 10, 2014 (JP) .................................. 2014-208928
Nov. 5, 2014 (JP) .................................. 2014-225404

(51) Int. Cl.
*G06F 3/12* (2006.01)
*H04N 1/00* (2006.01)
*H04N 1/333* (2006.01)

(52) U.S. Cl.
CPC ....... *H04N 1/00464* (2013.01); *H04N 1/0032* (2013.01); *H04N 1/00244* (2013.01); *H04N 1/00411* (2013.01); *H04N 1/33384* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,180,616 B2* | 2/2007 | Miyoshi | ............... | G06F 3/1213 358/1.1 |
| 8,051,379 B2* | 11/2011 | Iwata | ................... | G06K 15/007 715/744 |
| 2001/0049703 A1* | 12/2001 | Miyoshi | ............... | G06F 3/1213 715/234 |
| 2002/0122203 A1* | 9/2002 | Matsuda | ........... | H04N 1/00204 358/1.15 |
| 2002/0196460 A1* | 12/2002 | Parry | .................... | G06F 3/1267 358/1.15 |
| 2003/0048470 A1* | 3/2003 | Garcia | .................. | G06F 3/1204 358/1.15 |
| 2003/0088642 A1* | 5/2003 | Price | ....................... | G06F 9/547 709/218 |

(Continued)

FOREIGN PATENT DOCUMENTS

| | | |
|---|---|---|
| JP | 11-085586 A | 3/1999 |
| JP | 2001-272885 A | 10/2001 |

(Continued)

*Primary Examiner* — Ted Barnes

(57) ABSTRACT

A second display control section of a multifunction printer switches from a first display process in which an external browser screen is displayed on a display section to a second display process in which an internal browser screen is displayed on the display section, and displays the internal browser screen on the display section according to the state of a paper feeding cassette and a cover member which are operated, when a change in state of the paper feeding cassette and the cover member is sensed by an event generation section while executing the first display process.

11 Claims, 12 Drawing Sheets

(56) References Cited

U.S. PATENT DOCUMENTS

| | | | |
|---|---|---|---|
| 2006/0077119 A1* | 4/2006 | Zhang | H04N 1/00204 345/2.1 |
| 2006/0077428 A1* | 4/2006 | Lovat | H04N 1/00204 358/1.15 |
| 2006/0107212 A1* | 5/2006 | Lovat | H04N 1/00204 715/700 |
| 2007/0086051 A1* | 4/2007 | Kunori | H04N 1/00127 358/1.15 |
| 2007/0165265 A1* | 7/2007 | Ito | H04N 1/00204 358/1.15 |
| 2008/0043137 A1* | 2/2008 | Rikima | H04N 1/00204 348/364 |
| 2008/0256630 A1* | 10/2008 | Fujikawa | H04N 1/00411 726/21 |
| 2009/0021780 A1* | 1/2009 | Sato | H04N 1/00347 358/1.15 |
| 2009/0161132 A1* | 6/2009 | Sato | H04N 1/00222 358/1.9 |
| 2009/0268229 A1* | 10/2009 | Richardson | G03G 15/5087 358/1.15 |
| 2010/0332878 A1* | 12/2010 | Ito | H04N 1/00885 713/323 |
| 2011/0119333 A1* | 5/2011 | Tamura | H04N 1/00222 709/203 |
| 2011/0125899 A1* | 5/2011 | Yamamoto | G06F 17/3028 709/225 |
| 2011/0134453 A1* | 6/2011 | Sakiyama | G06F 17/30861 358/1.13 |
| 2011/0145329 A1* | 6/2011 | Fukasawa | H04N 1/00411 709/203 |
| 2011/0157629 A1* | 6/2011 | Fukasawa | H04N 1/00127 358/1.15 |
| 2011/0157638 A1* | 6/2011 | Yamada | G06F 3/1205 358/1.15 |
| 2011/0173250 A1* | 7/2011 | Sato | H04N 1/00244 709/203 |
| 2011/0179466 A1* | 7/2011 | Hamada | H04N 1/00464 726/3 |
| 2011/0199645 A1* | 8/2011 | Ito | G06F 3/121 358/1.15 |
| 2011/0235103 A1* | 9/2011 | Ito | H04N 1/00464 358/1.15 |
| 2011/0242592 A1* | 10/2011 | Tamura | H04N 1/00204 358/1.15 |
| 2011/0246602 A1* | 10/2011 | Mihara | H04L 29/0809 709/217 |
| 2012/0005601 A1* | 1/2012 | Mori | G06F 17/30905 715/760 |
| 2012/0033257 A1* | 2/2012 | Okazawa | H04L 41/0803 358/1.15 |
| 2012/0047450 A1* | 2/2012 | Sato | G06F 21/31 715/760 |
| 2012/0081730 A1* | 4/2012 | Ito | H04N 1/00244 358/1.13 |
| 2012/0133965 A1* | 5/2012 | Osuki | H04N 1/00244 358/1.13 |
| 2012/0133966 A1* | 5/2012 | Sako | H04N 1/00222 358/1.13 |
| 2012/0182575 A1* | 7/2012 | Ikeda | H04N 1/00225 358/1.15 |
| 2012/0274980 A1* | 11/2012 | Koike | H04N 1/00244 358/1.15 |
| 2012/0307279 A1* | 12/2012 | Yoshida | H04N 1/00244 358/1.13 |
| 2012/0311028 A1* | 12/2012 | Tamura | H04N 1/00222 709/203 |
| 2013/0003111 A1* | 1/2013 | Mitsubori | H04L 43/0811 358/1.15 |
| 2013/0044346 A1* | 2/2013 | Ito | H04N 1/00244 358/1.14 |
| 2013/0050728 A1* | 2/2013 | Ito | G06K 15/005 358/1.13 |
| 2013/0050733 A1* | 2/2013 | Kuroda | G06K 15/005 358/1.13 |
| 2013/0054685 A1* | 2/2013 | Yamamoto | G06F 17/3028 709/203 |
| 2013/0067541 A1* | 3/2013 | Itoh | H04N 1/0097 726/4 |
| 2013/0254672 A1* | 9/2013 | Mihara | H04L 29/0809 715/738 |
| 2013/0293916 A1* | 11/2013 | Tamura | H04N 1/00204 358/1.13 |
| 2014/0071489 A1* | 3/2014 | Fukasawa | H04N 1/00411 358/1.15 |
| 2014/0139877 A1* | 5/2014 | Ohara | G06F 3/1293 358/1.15 |
| 2014/0139878 A1* | 5/2014 | Kadota | G06K 15/183 358/1.15 |
| 2014/0285842 A1* | 9/2014 | Watanabe | G06K 15/4065 358/1.15 |
| 2014/0285845 A1* | 9/2014 | Ishikawa | H04N 1/00204 358/1.15 |
| 2014/0293308 A1* | 10/2014 | Ishibashi | H04N 1/00244 358/1.13 |
| 2014/0293309 A1* | 10/2014 | Ishibashi | G06K 15/1809 358/1.13 |
| 2014/0293330 A1* | 10/2014 | Watanabe | G06K 15/4065 358/1.15 |
| 2014/0293334 A1* | 10/2014 | Ito | G06F 3/1204 358/1.15 |
| 2015/0002864 A1* | 1/2015 | Yamamoto | G06K 15/4065 358/1.2 |
| 2015/0055177 A1* | 2/2015 | Saito | G06F 3/1206 358/1.15 |
| 2015/0055178 A1* | 2/2015 | Ishibashi | G06F 3/1206 358/1.15 |
| 2015/0062645 A1* | 3/2015 | Yamakawa | G06F 3/1236 358/1.15 |
| 2015/0199155 A1* | 7/2015 | Cho | G06F 3/1222 358/1.14 |
| 2015/0222769 A1* | 8/2015 | Hino | H04N 1/00477 358/1.15 |
| 2015/0281482 A1* | 10/2015 | Yoshida | H04N 1/00244 358/1.13 |
| 2015/0341518 A1* | 11/2015 | Shimizu | H04N 1/00973 358/1.15 |
| 2015/0363674 A1* | 12/2015 | Sato | G06K 15/1803 358/1.15 |
| 2015/0373211 A1* | 12/2015 | Minamikawa | H04N 1/00973 358/1.15 |
| 2016/0028923 A1* | 1/2016 | Yasuhara | H04N 1/4433 358/1.14 |
| 2016/0105576 A1* | 4/2016 | Osawa | H04N 1/00488 358/1.15 |

FOREIGN PATENT DOCUMENTS

| | | |
|---|---|---|
| JP | 2002-278377 A | 9/2002 |
| JP | 2003-223081 A | 8/2003 |
| JP | 2013-090264 A | 5/2013 |
| JP | 2014-048746 A | 3/2014 |
| JP | 2014-184667 A | 10/2014 |
| JP | 2014-188803 A | 10/2014 |
| JP | 2014-196160 A | 10/2014 |

* cited by examiner

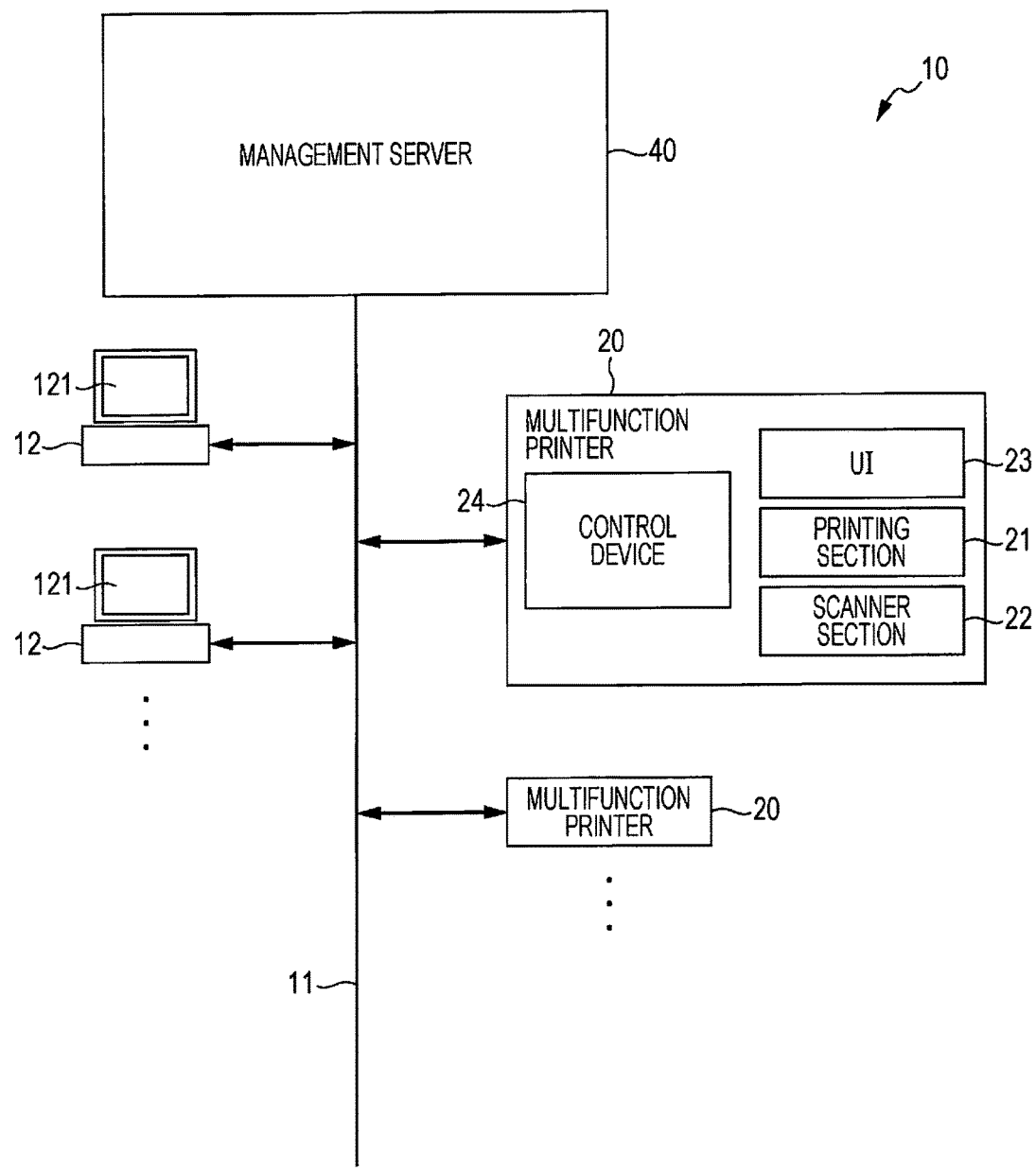

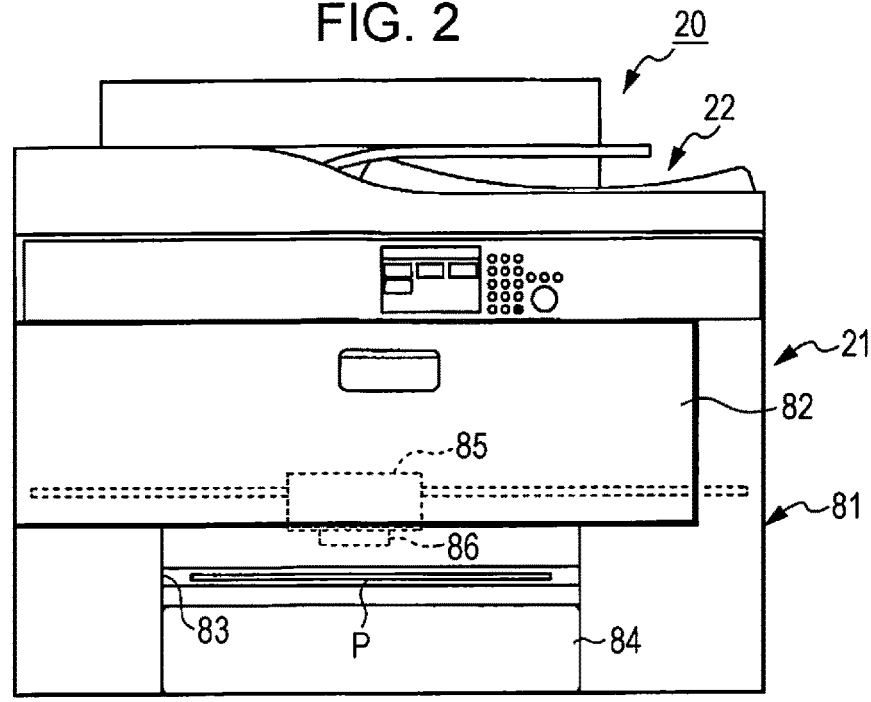
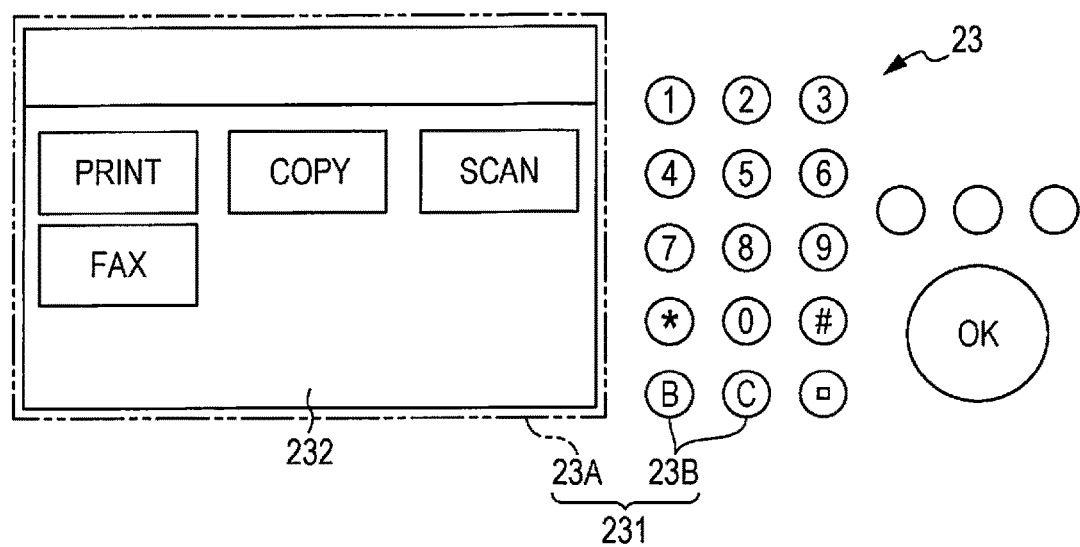

ELECTRONIC APPARATUS AND DISPLAY CONTROL METHOD FOR ELECTRONIC APPARATUS

CROSS REFERENCES TO RELATED APPLICATIONS

This application claims priority to Japanese Application No. 2014-225404, filed Nov. 5, 2014 and No. 2014-208928, filed Oct. 10, 2014, the entirety of which are incorporated by reference herein.

BACKGROUND

1. Technical Field

The present invention relates to an electronic apparatus which has a display section and a display control method for the electronic apparatus.

2. Related Art

JP-A-2014-48746 describes a multifunction printer (an example of an electronic apparatus) which has a web browser function. In such a multifunction printer, it is possible to display a browser screen, which is a screen that is generated by an external server, on its own display section. That is, when a uniform resource locator (URL) which is an example of access information is designated by the external server, a control device of the multifunction printer requests browser screen information which is information which relates to the browser screen of the URL, and receives (downloads) the browser screen information. Then, the control device displays the browser screen which is based on the received browser screen information on the display section.

Here, a printing apparatus such as the multifunction printer also includes an apparatus which is not provided with a sensor for sensing an attribute (such as size or type) of a paper sheet (an example of a medium) that is set in a paper sheet cassette which configures an example of a mechanism section. In such a printing apparatus, it is possible to acquire the attribute of the paper which is set in the paper sheet cassette by a user operating a user interface which configures the printing apparatus.

Here, the operation of the user interface by a user for setting the attribute of the paper sheet in this manner may be performed when the paper sheet cassette is operated, the paper sheet cassette is detached from the main body of the printing apparatus, and the paper sheet cassette is mounted to the main body. For this reason, when a change in state of the paper sheet cassette which is caused by the operation of the paper sheet cassette by the user is detected, it is preferable to switch a screen which is displayed on the display section of the printing apparatus to a screen for paper attribute setting which is an example of a screen according to an aspect of the change in state of the mechanism section at that time.

However, in a system which is provided with a printing apparatus which displays a browser screen of an URL that is designated by an external server on the display section, and the external server, it is not possible to sense a change in state of the paper sheet cassette, which is caused by the operation of the paper sheet cassette by the user, using the external server. For this reason, in the external server, it is not possible to measure the timing at which the screen for paper attribute setting is displayed on the display section of the printing apparatus, and there is a concern that the screen for paper attribute setting is not displayed on the display section of the printing apparatus even if the state of the paper sheet cassette is changed by an operation of the paper sheet cassette by the user.

SUMMARY

An advantage of some aspects of the invention is to provide an electronic apparatus which is able to display a screen on a display section according to an aspect of a change in state of a mechanism section when the mechanism section is operated by a user and a display control method for the electronic apparatus.

An electronic apparatus for realizing the above advantage is an electronic apparatus which is able to communicate with an external server via a network, including an operable mechanism section, a state change sensing section which senses a change in state of the mechanism section which is caused by an operation of the mechanism section, a display section which displays a screen, an internal screen information output section which outputs internal screen information that is screen information which relates to the screen that is displayed on the display section, and a display control section which executes a first display process in which a screen that is based on external server screen information which is screen information received from the external server is displayed on the display section and a second display process in which a screen that is based on the internal screen information which is output from the internal screen information output section is displayed on the display section, in which the display control section switches from the first display process to the second display process and displays a screen that is based on the internal screen information which relates to a screen according to the aspect of the change in state of the mechanism section on the display section when the change in state of the mechanism section is sensed by the state change sensing section while executing the first display process.

According to the configuration above, the display process is switched from the first display process to the second display process when the change in state of the mechanism section which is caused by an operation of the mechanism section by a user is sensed under circumstances in which the screen that is based on external server screen information which is received from the external server is displayed on the display section. By doing this, internal screen information, which relates to the screen according to the aspect of the change in state of the mechanism section, is output from the internal screen information output section to the display control section, and a screen which is based on the internal screen information is displayed on the display section. Accordingly, when the mechanism section is operated by a user, it is possible to display a screen on the display section according to the aspect of the change in state of the mechanism section at that time.

It is preferable that the electronic apparatus further includes a printing section which executes printing on a medium, the mechanism section accommodates the medium prior to printing, and includes a medium accommodating section which is attachable and detachable with respect to a main body of the electronic apparatus, and the display control section switches from the first display process to the second display process, and displays the screen that is based on internal screen information which relates to the screen for setting an attribute of the medium which is set in the medium accommodating section on the display section when the change in state of the medium accommodating section is sensed by the state change sensing section while executing the first display process.

When the medium accommodating section is operated by the user, there is a possibility that the attribute of the medium which is accommodated in the medium accommodating section is changed. For this reason, it is necessary to display a screen for setting the attribute of the medium in the display section of the electronic apparatus, and for the user to set the attribute of the medium which is accommodated in the medium accommodating section. With this point, according to the configuration above, the display process is switched from the first display process to the second display process when the change in state of the medium accommodating section is sensed, which is caused by an operation of the medium accommodating section by a user under circumstances in which the screen that is based on external server screen information which is received from the external server is displayed on the display section. As a result, it is possible to display the screen for setting the attribute of the medium on the display section of the electronic apparatus.

In the electronic apparatus, it is preferable that the mechanism section includes a cover member, the cover member is configured such that displacement is possible between a shielding position for covering an inner section of the electronic apparatus and an opening position for exposing the inner section of the electronic apparatus to the outside, the display control section switches from the first display process to the second display process, and displays the screen that is based on the internal screen information which relates to the screen according to the change in position of the cover member on the display section when the change in the position of the cover member from the shielding position is sensed by the state change sensing section while executing the first display process.

According to the configuration above, the display process is switched from the first display process to the second display process when the displacement of the cover member from the shielding position is sensed under circumstances in which the screen that is based on external server screen information which is received from the external server is displayed on the display section. As a result, it is possible to display the screen on the display section of the electronic apparatus according to the change in the state of the cover member.

It is preferable that the internal screen information output section is provided inside the electronic apparatus, and is an internal server which outputs a web page of the internal screen information.

According to the configuration above, the screen of the web page which is output by the internal server is displayed on the display section when the change in state of the mechanism section is sensed, which is caused by an operation of the mechanism section by a user under circumstances in which the screen that is based on external server screen information which is received from the external server is displayed on the display section.

It is preferable that the electronic apparatus further includes a native screen memory section which stores native screen information that is screen information which relates to the screen that is displayed on the display section, the display control section executes a third display process in which a screen that is based on the native screen information which is read out from the native screen memory section is displayed on the display section, and the display control section switches from the third display process to the second display process and displays a screen that is based on the internal server screen information which relates to a screen according to the aspect of the change in state of the mechanism section on the display section when the change in state of the mechanism section is sensed by the state change sensing section while executing the third display process.

In the electronic apparatus, the screen that is based on the native screen information may be displayed on the display section. Then, the state of the operation section may also be changed by the operation of the operation section by the user when the screen that is based on such native screen information is displayed on the display section. Therefore, in the configuration above, when the change in state of the operation section is sensed under circumstances in which the screen that is based on the native screen information is displayed on the display section, display on the display section of the screen that is based on the native screen information is ended, and the screen that is based on the internal server screen information which relates to the screen according to the aspect of the change in state of the operation section at that time is displayed on the display section. Accordingly, even when the mechanism section is operated by the user under circumstances in which the screen that is based on the native screen information is displayed on the display section, it is possible to quickly display the screen on the display section according to the aspect of the change in state of the mechanism section at that time.

In the electronic apparatus, it is preferable that the internal server designates the internal access information with respect to the display control section when the change in state of the mechanism section is sensed by the state change sensing section, and outputs the internal server screen information of the requested screen to the display control section, and when the second display process is executed, the display control section requests a screen according to internal access information which is designated by the internal server, and displays the screen that is based on the internal server information which is input from the internal server according to the request on the display section.

According to the configuration above, in the case where the second display process is executed, the internal server screen information which relates to the screen according to internal access information which is designated by the internal server is output from the internal server to the display control section. Thereby, it is possible to display the screen on the display section according to the aspect of the change in state of the mechanism section.

In the electronic apparatus, it is preferable that the internal screen information output section is a native screen memory section which stores native screen information which is screen information that relates to the screen which is displayed on the display section.

According to the configuration above, the screen that is based on the native screen information which is output from the native screen memory section is displayed on the display section when the change in state of the mechanism section is sensed, which is caused by an operation of the mechanism section by the user under circumstances in which the screen that is based on external server screen information is displayed on the display section.

In the electronic apparatus, it is preferable that when the first display process is executed, the display control section receives the server screen information from the external server based on the access information which is designated by the external server and displays the screen that is based on the server screen information on the display section, the display control section includes an access information memory section which stores access information which is designated by the external server, and when the change in state of the mechanism section is sensed by the state change sensing section while executing the first display process, the display control section stores the latest access information which is designated by the external server in the access information memory section, and thereafter when ending the second display process and resuming the first display process, the display control section displays the screen that is based on the server screen information which corresponds to the latest access information which is stored in the access information memory section on the display section.

According to the configuration above, in a case where the display process is switched from the first display process to the second display process, the latest access information which is designated by the external server is stored in the access information memory section of the electronic apparatus. For this reason, thereafter when the second display process is ended, and the first display process is resumed, the screen that is based on the latest stored access information from the access information memory section is displayed on the display section. That is, it is possible to display the screen which is displayed on the display section prior to the start of the first display process again on the display section even if the access information is not newly received from the external server.

A display control method for an electronic apparatus for realizing the above advantage is a display control method for an electronic apparatus which is able to communicate with an external server via a network, in which the electronic apparatus includes an operable mechanism section, a display section which displays a screen, and a control device which controls the display state of the display section, the control device is provided with an internal server that generates internal server screen information which is screen information that relates to the screen which is displayed on the display section, the display control method including, causing the control device to execute a first display step of displaying the screen that is based on external server screen information which is screen information that is received from the external server on the display section, a second display step of displaying the screen that is based on internal server screen information which is screen information that is generated by the internal server on the display section, a state change sensing step of sensing the change in state of the mechanism section that is caused by an operation of the mechanism section, and a switching step of switching from the first display step to the second display step when the change in state of the mechanism section is sensed in the state change sensing step while the screen that is based on the external server screen information is displayed on the display section, and a step of acquiring the internal server screen information which relates to the screen according to the aspect of the change in state of the mechanism section from the internal server and displaying the screen that is based on the internal server screen information on the display section when the second display step is executed according to the execution of the switching step.

According to the configuration above, it is possible to obtain the same operations and effects as the electronic apparatus above.

BRIEF DESCRIPTION OF THE DRAWINGS

The invention will be described with reference to the accompanying drawings, wherein like numbers reference like elements.

FIG. 1 is a configuration diagram illustrating a schematic of a management system which is provided with a multifunction printer that is an embodiment of an electronic apparatus.

FIG. 2 is a schematic view illustrating a schematic configuration of the multifunction printer.

FIG. 3 is a schematic view illustrating an example of a user interface of the multifunction printer.

DESCRIPTION OF EXEMPLARY EMBODIMENTS

Figure 4:
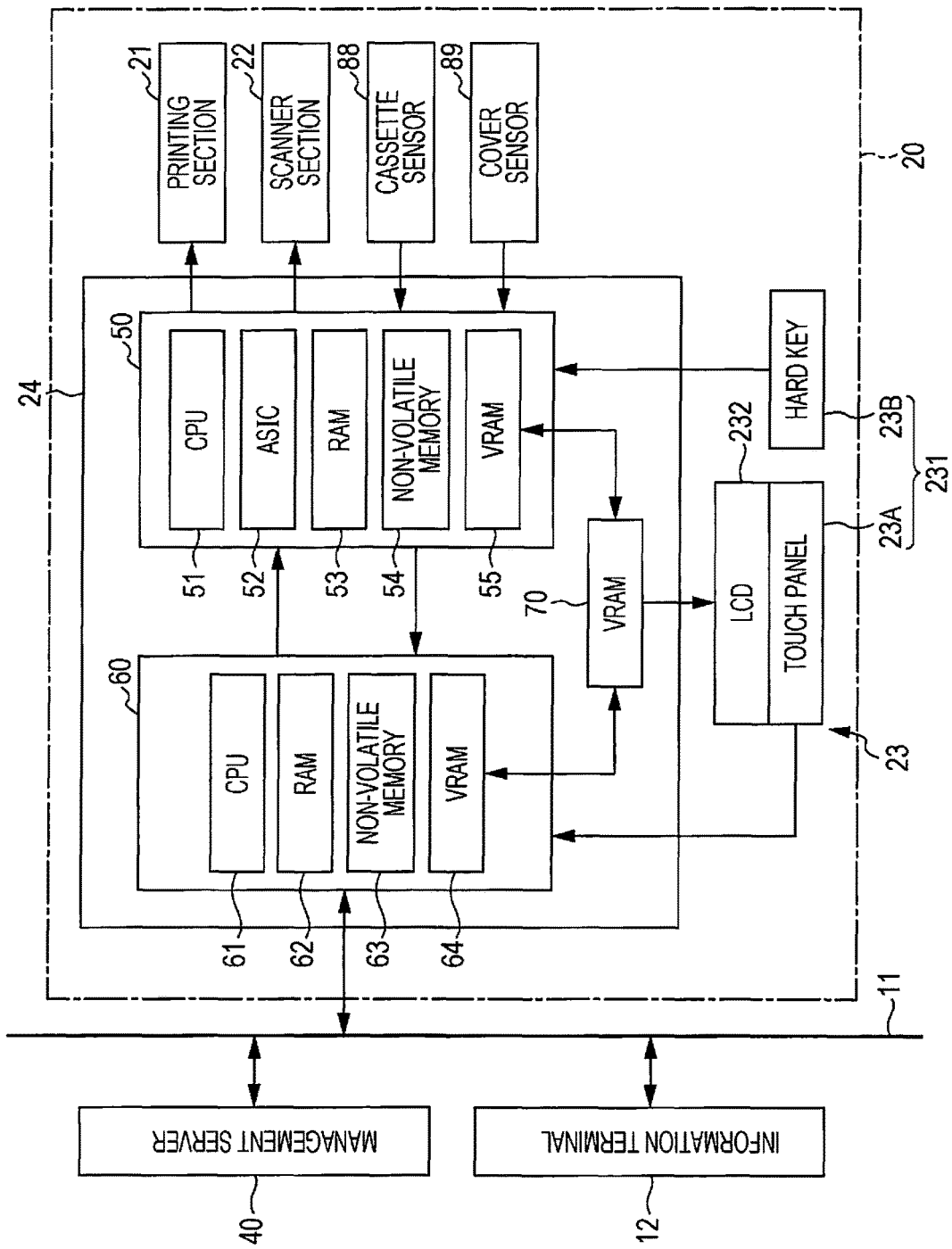
FIG. 4 is a block diagram illustrating an electrical configuration of the multifunction printer.

A first embodiment which is embodied by an electronic apparatus and a display control method for the electronic apparatus will be described in accordance with FIGS. 1 to 17.

FIG. 1 illustrates a management system 10 which is provided with a multifunction printer 20 that is an example of the electronic apparatus. As shown in FIG. 1, the management system 10 is provided with a management server 40 which is an example of an external server, and a plurality of the multifunction printers 20 which are able to communicate with the management server 40 through a network 11 such as a local area network (LAN). In addition, in the management system 10, an information terminal 12 which is used by a user is connected to the network 11.

The information terminal 12 has a monitor 121 which is an example of a display section, and is able to communicate with both of the multifunction printer 20 and the management server 40 via the network 11. That is, it is possible to display a screen (internal browser screen) that is based on screen information which is transmitted from the multifunction printer 20 (in detail, internal browser screen information which will be described later) on the monitor 121 of the information terminal 12.

The multifunction printer 20 is provided with a printing section 21 of an ink jet type which executes printing on a medium such as a paper sheet, a scan section 22 which reads an image that is stored on the medium, a user interface 23, and a control device 24 which controls the management server 40 and the multifunction printer 20. As long as it is possible to print on the medium, the printing method by the printing section 21 may be another method other than an ink jet method such as a dot impact method, a laser method, or a thermal method.

A printer, a copier, a scanner, and a facsimile (hereinafter referred to as "fax") are included as processes which are executable by the multifunction printer 20. For example, when a user requests printing by operating the information terminal 12, a print job is transmitted from the information terminal 12 to the management server 40. Then, when the print job is transmitted from the management server 40 to at least one multifunction printer out of all multifunction printers 20, the multifunction printer performs printing based on the print job.

Here, printing is a process based on a print job which is received from the management server 40, and is an example of a "reception required process" based on information which is received from the management server 40. Meanwhile, a process other than printing, that is, copying, scanning, and faxing is an example of a "reception unrequired process" in which reception of information from the management server 40 is not necessary.

Next, a configuration of the multifunction printer 20 will be described with reference to FIG. 2.

As shown in FIG. 2, the printing section 21 and the scan section 22 are disposed lined up in the up and down direction in the multifunction printer 20. The printing section 21 is provided with a printing section case 81 which configures a portion of a casing of the multifunction printer 20, and the user interface 23 is disposed on an upper section at the front surface side in the printing section case 81.

A cover member 82, which configures an example of the mechanism section, is attached so to be open and closeable further below the user interface 23 in the printing section case 81. The cover member 82 is configured to be displaceable (in this case, rotatable) between a shielding position for covering an inner section of the printing section 21 and an opening position for opening the inner section of the printing section 21 to the outside. Then, due to the cover member 82 being disposed at the opening position, it is possible for a user to cause their own hand or the like to enter the printing section case 81, and thus it is possible it is possible to perform various maintenance such as replacement of parts.

In addition, a discharge port 83 which discharges the printed paper sheet P (one example of the medium) is provided below the cover member 82 in the printing section case 81. Then, a paper feeding cassette 84 which is an example of the medium accommodating section that accommodates the paper sheet P prior to printing is mounted so as to be attachable and detachable below the discharge port 83 in the printing section case 81. Here, an example of the "mechanism section" which is operable by a user is configured by the paper feeding cassette 84.

A carriage 85 which moves in the main scanning direction that is the left and right direction in the drawings, and a printing head 86 which is supported on the carriage 85 are provided inside such a printing section case 81. Then, printing is executed on the paper sheet P by discharging a printing material such as ink from the printing head 86 toward the paper sheet P.

Next, the user interface 23 of the multifunction printer 20 will be described with reference to FIG. 3.

As shown in FIG. 3, the user interface 23 is provided with an operation section 231, which receives an input operation from the user, and a display section 232. The operation section 231 has a touch panel 23A which is attached to the display section 232, and a plurality of push button-type hard keys 23B. Here in FIG. 2, the touch panel 23A is indicated by a chain double-dashed line. Then, when a region is selected for "printing" on, for example, the display section 232 by an operation of the touch panel 23A by the user, it is possible for the management system 10 to recognize when printing is requested by the user.

Here, the input information which is caused by the operation section 231 by the user is input to the control device 24 of the multifunction printer 20. That is, when the hard keys 23B are operated, key operation information which is information that relates to an operation of the hard keys 23B is input to the control device 24 as input information, and the key operation information is analyzed by the control device 24. Meanwhile, when the touch panel 23A is operated, panel operation information which is information that relates to the operation of the touch panel 23A is input to the control device 24 as input information. There are times when such panel operation information is transmitted from the control device 24 to the management server 40. Then, when the panel operation information is transmitted to the management server 40 in this manner, the panel operation information is analyzed by the management server 40. Meanwhile, when the panel operation information is not transmitted to the management server 40, the panel operation information is analyzed by the control device 24.

Next, the control device 24 of the multifunction printer 20 will be described with reference to FIG. 4.

As shown in FIG. 4, the control device 24 is provided with a multi-core processor. Then, out of a plurality of (in this case two) control circuits 50 and 60 which configure the control device 24, the first control circuit 50 governs control of the multifunction printer 20, and the second control circuit 60 governs communication with the management server 40 and the information terminal 12. In this manner, each control circuit 50 and 60 is configured so as to be able input and output information with respect to each other.

The first control circuit 50, for example, executes printing on the paper sheet P by controlling the printing section 21 when a user requests execution of printing. In addition, the first control circuit 50, for example, executes copying by controlling the printing section 21 and the scan section 22 when a user requests execution of copying.

When the hard keys 23B of the operation section 231 of the user interface 23 are operated in such a first control circuit 50, key operation information which relates to the operation of the hard keys 23B is input as input information.

In addition, the first control circuit 50 is electrically connected to a cassette sensor 88 for sensing that the paper feeding cassette 84 is operated, and a cover sensor 89 for sensing that the position of the cover member 82 is changed from the shielding position to the opening position. For this reason, the first control circuit 50 is able to sense that the paper feeding cassette 84 is detached from the printing section case 81, and that the paper feeding cassette 84 is mounted on the printing section case 81 by monitoring a signal from the cassette sensor 88. In addition, the first control circuit 50 is able to sense that the cover member 82 is not positioned at the shielding position by monitoring a signal from the cover sensor 89.

The first control circuit 50 has a CPU 51, an ASIC 52, a RAM 53, a non-volatile memory 54, and a VRAM 55. "ASIC" is an abbreviation of "application specific IC", and "VRAM" is an abbreviation of "video random access memory". Various programs which are executed by the CPU 51, necessary setting data, and the like are stored in the non-volatile memory 54. The programs which are executed by the CPU 51, and data such as various calculation results are temporarily stored in the RAM 53. Screen information (hereinafter referred to as "native screen information") which is information that is related to the native screen which is a screen that is displayed on the display section 232 by the first control circuit 50 is stored in the VRAM 55. Here, the native screen includes a screen which is prepared in advance by the multifunction printer 20.

In addition, the first control circuit 50 also has a function as an internal server. That is, the first control circuit 50 has a function in which the browser screen (hereinafter referred to as an "internal browser screen") of an URL (hereinafter referred to as an "internal URL") which is an example of internal access information that is designated by itself is displayed on the monitor 121 of the information terminal 12. "URL" is an abbreviation of "uniform resource locator".

In detail, when designating the internal URL with respect to the information terminal 12, the first control circuit 50 requests the internal browser screen of the designated internal URL from the information terminal 12. By doing this, the first control circuit 50 transmits the internal browser screen information which is screen information that relates to the requested internal browser screen to the information terminal 12. At this time, the internal browser screen information is transmitted to the information terminal 12 via the second control circuit 60. Thereby, the first control circuit 50 is able display the internal browser screen that is based on the transmitted internal browser screen information on the monitor 121 of the information terminal 12. Here, the internal browser screen information is an example of the "internal server screen information".

The second control circuit 60 has a CPU 61, a RAM 62, a non-volatile memory 63, and a VRAM 64. Various programs which are executed by the CPU 61, necessary setting data, and the like are stored in the non-volatile memory 63. The programs which are executed by the CPU 61, and data such as various calculation results are temporarily stored in the RAM 62. Screen information (hereinafter referred to as "browser screen information") which is information that is related to the browser screen which is a screen that is displayed on the display section 232 by the second control circuit 60 is stored in the VRAM 64.

The browser screen information is added to the internal browser screen information described above, and includes external browser screen information which is screen information that is received (downloaded) from an URL (hereinafter referred to as an "external URL") which is an example of external access information that is designated by the management server 40. The external browser screen information is an example of the "external server screen information". Then, in the second control circuit 60, when the external browser screen information is received, the external browser screen information is stored in the VRAM 64.

Here, in the embodiment, in a case where an interrupt display event is generated by the multifunction printer 20 which will be described later in detail, there are times when the second control circuit 60 stores the internal browser screen information which is input from the first control circuit 50 in the VRAM 64.

In addition, when the touch panel 23A of the operation section 231 of the user interface 23 is operated in the second control circuit 60, panel operation information which relates to the operation of the touch panel 23A is input as input information. Then, the second control circuit 60 transmits the input panel operation information to the management server 40, and outputs to the first control circuit 50.

In addition, the control device 24 has a VRAM 70 that is separate to the VRAM 55 of the first control circuit 50 and the VRAM 64 of the second control circuit 60. Screen information which relates to a screen that is displayed on the display section 232 is stored in the VRAM 70. Both of the first control circuit 50 and the second control circuit 60 are accessible to the VRAM 70. Then, the first control circuit 50 and the second control circuit 60 have a display control driver for controlling the display section 232. For this reason, in the multifunction printer 20 of the embodiment, display control is possible by the first control circuit 50, and display control is possible by the second control circuit 60.

In detail, by which control circuit to execute display control is determined by the first control circuit 50. That is, the first control circuit 50 manages control rights for the display section 232. For example, in a case where the first control circuit 50 has the control rights, the first control circuit 50 executes a third display process. In the third display process, the native screen based on the native screen information is displayed on the display section 232 using the native screen information which is stored in the VRAM 70.

Meanwhile, in a case where the second control circuit 60 receives the control rights from the first control circuit 50, the second control circuit 60 executes a first display process or a second display process. The first display process is received from the management server 40 and stored in the VRAM 64, and the external browser screen is displayed on the display section 232 due to the external browser screen information which is stored in the VRAM 64 being moved to the VRAM 70. In addition, in the second display process, the internal browser screen information which is input from the first control circuit 50 is stored in the VRAM 64, and the internal browser screen is displayed on the display section 232 due to the internal browser screen information which is stored in the VRAM 64 being moved to the VRAM 70.

Next, a function configuration of the control device 24 of the multifunction printer 20 will be described with reference to FIG. 5.

Figure 5:
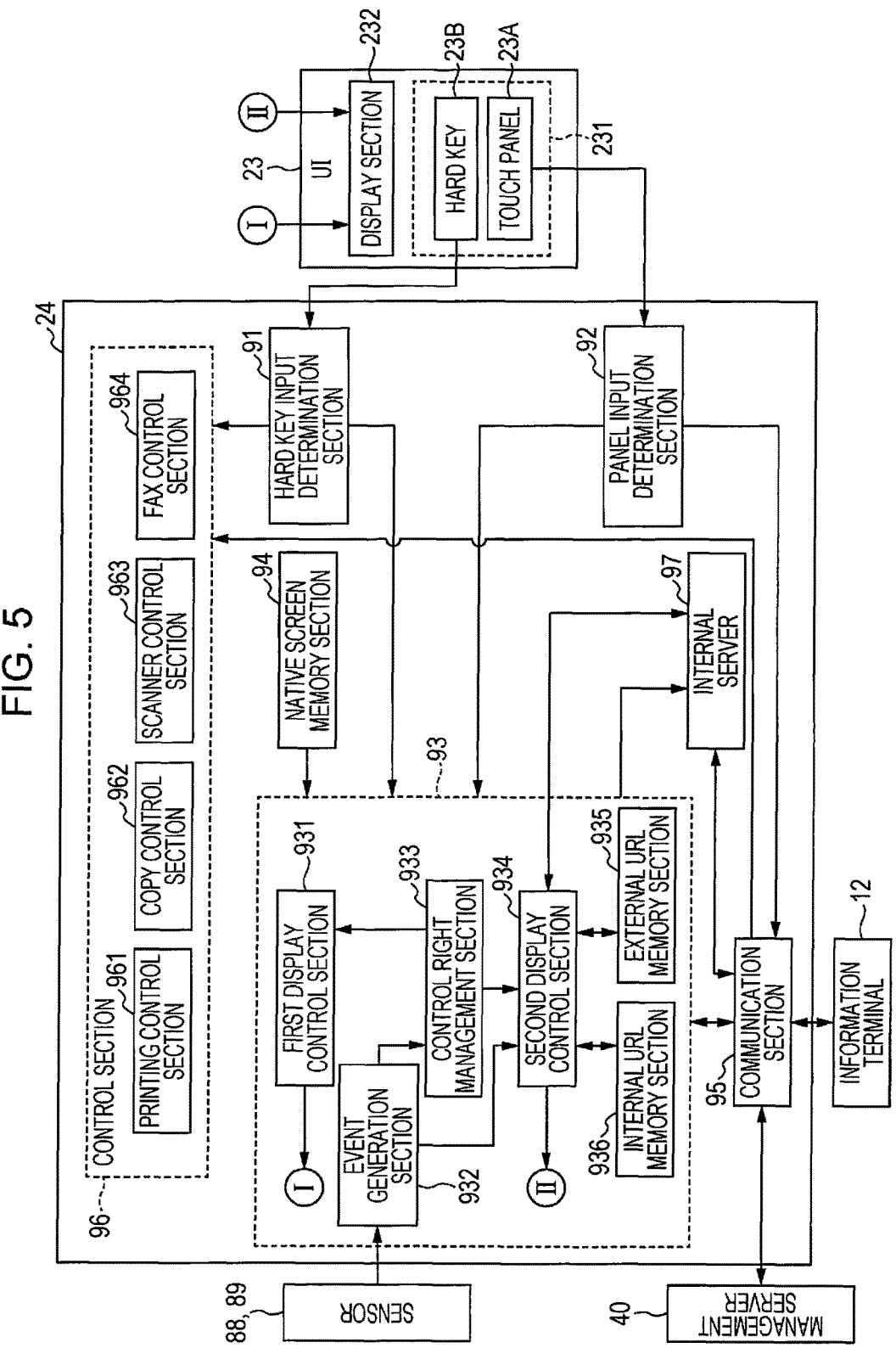
FIG. 5 is a block diagram illustrating a functional configuration of the control device of the multifunction printer.

As shown in FIG. 5, the control device 24 of the multifunction printer 20 has a hard key input determination section 91, a panel input determination section 92, an internal server 97, a UI control section 93, a native screen memory section 94, a communication section 95, and a control section 96 as the function sections which are configured by at least one of software and hardware.

The hard key input determination section 91 is configured by the CPU 51 of the first control circuit 50 which executes a predetermined program. When the user operates the hard keys 23B, hard key operation information is input from the user interface 23 in such a hard key input determination section 91. Then, the hard key input determination section 91 analyzes the input hard key operation information, outputs the analysis result to the UI control section 93, and outputs to the control section 96.

The panel input determination section 92 is configured by the CPU 61 of the second control circuit 60 which executes a predetermined program. When the user operates the touch panel 23A, panel operation information is input from the user interface 23 in such a panel input determination section 92. Then, when the panel input determination section 92 displays the external browser screen on the display section 232, the input panel operation information is output to the communication section 95. By doing this, the panel operation information is transmitted from the communication section 95 to the management server 40. Meanwhile, when the panel input determination section 92 displays the native screen and the internal browser screen on the display section 232, the panel operation information is output to the UI control section 93.

The internal server 97 is configured by the CPU 51 of the first control circuit 50 which executes the predetermined program. Such an internal server 97 generates the internal browser screen, and manages the internal browser screen by associating with an internal URL. That is, when the interrupt display event is generated by an event generation section 932 which will be described later, the instruction is input to the internal server 97. By doing this, the internal server 97 generates the internal browser screen which corresponds to the generated interrupt display event, and outputs (designates) the internal URL which corresponds to the internal browser screen to the UI control section 93 (in detail, a second display control section 934 which will be described later). Then, when the internal server 97 requests the internal browser screen of the designated internal URL from the UI control section 93 (the second display control section 934), the internal browser screen information which relates to the internal browser screen is output to the UI control section 93 (the second display control section 934).

In addition, the internal server 97 also displays the internal browser screen on the monitor 121 of the information terminal 12. At this time, the internal server 97 transmits (designates) the internal URL which corresponds to the internal browser screen that is desired to be displayed on the monitor 121 to the information terminal 12 via the communication section 95. Then, when the internal server 97 requests the internal browser screen of the designated internal URL from the information terminal 12, the internal browser screen information which relates to the internal browser screen is transmitted to the information terminal 12 via the communication section 95. Thereby, the internal browser screen that is based on the transmitted internal browser screen information is displayed on the monitor 121 of the information terminal 12.

The UI control section 93 is configured by the CPU 51 and a display driver of the first control circuit 50 which executes the predetermined program, the CPU 61 and a display driver of the second control circuit 60 which executes the predetermined program, and the VRAM 70. Such a UI control section 93 has a first display control section 931, the event generation section 932, a control rights management section 933, the second display control section 934, an external URL memory section 935, and an internal URL memory section 936.

The first display control section 931 is configured by the display driver of the first control circuit 50, the CPU 51 of the first control circuit 50, and the VRAM 70. Such a first display control section 931 reads the native screen information which is stored in the native screen memory section 94, and executes the third display process in which the native screen that is based on the native screen information is displayed on the display section 232. In this point, an example of the "display control section" in which the third display process is executed in which the native image that is based on the native screen information which is read from the native screen memory section 94 is displayed on the display section 232 is configured by the first display control section 931.

The event generation section 932 is configured by the CPU 51 of the first control circuit 50 which executes the predetermined program. Such an event generation section 932 monitors changes in signals from the sensors 88 and 89. For this reason, the event generation section 932 is able to sense that the cover member 82 or the paper feeding cassette 84 which is an example of the mechanism section is operated based on the signals from the sensors 88 and 89. In this point, an example of a "state change sensing section" which senses a change in state of the cover member 82 or the paper feeding cassette 84 which is caused by an operation of the cover member 82 or the paper feeding cassette 84 is configured by the event generation section 932. Then, when the event generation section 932 senses the change in state of the cover member 82 or the paper feeding cassette 84, the interrupt display event is generated which is caused by the change in state of the mechanism section, and the instruction is output to the internal server 97, the control rights management section 933, and the second display control section 934.

The control rights management section 933 is configured by the CPU 51 of the first control circuit 50 which executes the predetermined program. Such a control rights management section 933 manages whether the display process is executed in the first display control section 931 or executed in the second display control section 934. For example, when the event generation section 932 generates the interrupt display event under circumstances in which the first display process which will be described later is executed by the second display control section 934, the control rights management section 933 holds the control rights for the display section 232 using the second display control section 934.

Meanwhile, when the event generation section 932 generates the interrupt display event under circumstances in which the third display process is executed by the first display control section 931, the control rights management section 933 outputs an instruction which yields the control rights for the display section 232 to the second display control section 934 from the first display control section 931 to the first display control section 931 and the second display control section 934. After this, when the interrupt display event is ended, the control rights management section 933 outputs an instruction of returning the control rights for the display section 232 to the first display control section 931 from the second display control section 934 to the first display control section 931 and the second display control section 934.

The second display control section 934 is configured by the display driver of the second control circuit 60, the CPU 61 of the second control circuit 60 which executes the predetermined program, and the VRAM 70. Such a second display control section 934 executes the first display process in which the external browser screen that is based on the external browser screen information which is received from the management server 40 is displayed on the display section 232. At this time, the second display control section 934 receives the external URL which is designated by the management server 40 via the communication section 95, and stores the external URL in the external URL memory section 935. Then, when the second display control section 934 has the control rights for the display section 232, the second display control section 934 requests the external browser screen of the latest external URL which is stored in the external URL memory section 935, and receives the (downloads) the external browser screen information which relates to the external browser screen from the management server 40 via the communication section 95. Subsequently, the second display control section 934 displays the external browser screen that is based on the received external browser screen information on the display section 232.

In addition, the second display control section 934 executes the second display process in which the internal browser screen that is based on the internal browser screen information which is input from the internal server 97 is displayed on the display section 232. At this time, the second display control section 934 inputs the internal URL which is designated by the internal server 97, and stores the internal URL in the internal URL memory section 936. Then, when the second display control section 934 inputs the instruction in which the event generation section is generated, and has the control rights for the display section 232, the second display control section 934 requests the internal browser screen of the latest internal URL which is stored in the internal URL memory section 936, and inputs the internal browser screen information which relates to the internal browser screen from the internal server 97.

Subsequently, the second display control section 934 displays the internal browser screen that is based on the input internal browser screen information on the display section 232. Accordingly, in this point, an example of the "display control section" in which the first display process and the second display process are executed is configured by the second display control section 934.

Here, while the second display control section 934 receives the external browser screen information, there are times when the control rights for the display section 232 are transitioned from the second display control section 934 to the first display control section 931. In this case, the second display control section 934 suspends reception of the external browser screen information, and suspends the first display process in which the external browser screen is displayed on the display section 232. In the same manner, while the internal browser screen information is input to the second display control section 934, there are times when the control rights for the display section 232 are transitioned from the second display control section 934 to the first display control section 931. In this case, the second display control section 934 suspends input of the internal browser screen information from the internal server 97, and suspends the second display process in which the internal browser screen is displayed on the display section 232.

In addition, while the second display control section 934 receives the external URL, there are times when the control rights for the display section 232 are transitioned from the second display control section 934 to the first display control section 931. In this case, even if the third display process is started by the first display control section 931, the second display control section 934 continues reception of the external URL, and stores the received external URL in the external URL memory section 935. However, when the second display control section 934 does not have the control rights for the display section 232, the second display control section 934 does not request the external browser screen of the external URL to the management server 40.

The control section 96 is configured by the CPU 51 of the first control circuit 50 which executes the predetermined program, and the ASIC 52 of the first control circuit 50. Such a control section 96 includes a printing control section 961, a copying control section 962, a scanning control section 963, and a fax control section 964.

When printing is requested, the printing control section 961 receives the print job from the management server 40, and printing is performed based on the print job. When copying is requested, the copying control section 962 executes copying by controlling the printing section 21 and the scan section 22.

When scanning is requested, the scanning control section 963 executes scanning by controlling the scan section 22, and transmits the acquired image information to the information terminal 12. The information terminal 12 which is the transmission target is able to select using an operation of the operation section 231 by the user.

When faxing is requested, the fax control section 964 reads an image which is recorded on the medium by controlling the scan section 22, and the acquired image information is transmitted to a transmission destination as fax information.

Next, the screen which is displayed on the display section 232 of the multifunction printer 20 will be described with reference to FIGS. 6 to 11.

Figure 6:
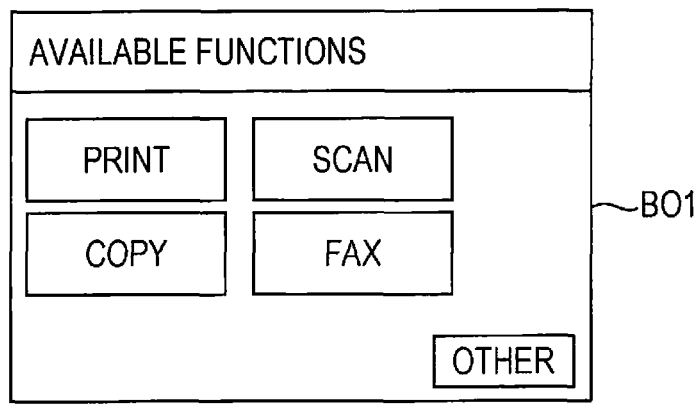
FIG. 6 is a diagram illustrating an example of a screen that displays processes which are permitted to be used by the multifunction printer.

The screen illustrated in FIG. 6 is an example of a process selection screen BO1 for selecting, by the user, a process which is executed in the multifunction printer 20. In addition to "print", "scan", "copy", and "fax", "other" is displayed on the process selection screen BO1 so as to be selectable. Then, various maintenance and settings of the multifunction printer 20 are possible in a case where "other" is selected on the process selection screen BO1. Here, such a process selection screen BO1 is an external browser screen.

Figure 7:
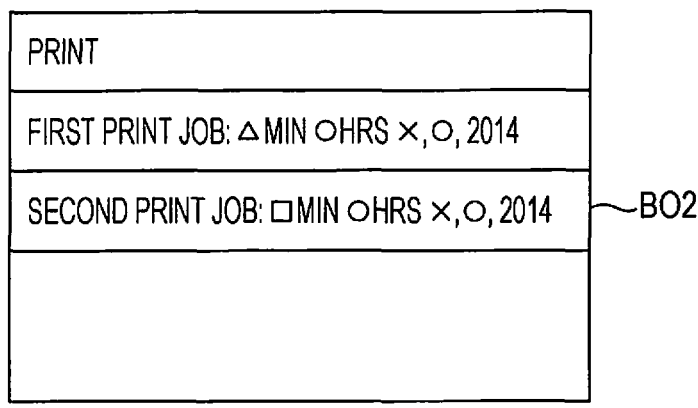
FIG. 7 is a diagram illustrating an example of a screen that displays selectable print jobs in a list.

The screen illustrated in FIG. 7 is an example of the screen in a case where "print" is selected on the process selection screen BO1. The screen is an example of a job list screen BO2 which lists print jobs which are selectable by the user. Here, such a job list screen BO2 is an external browser screen.

Figure 8:
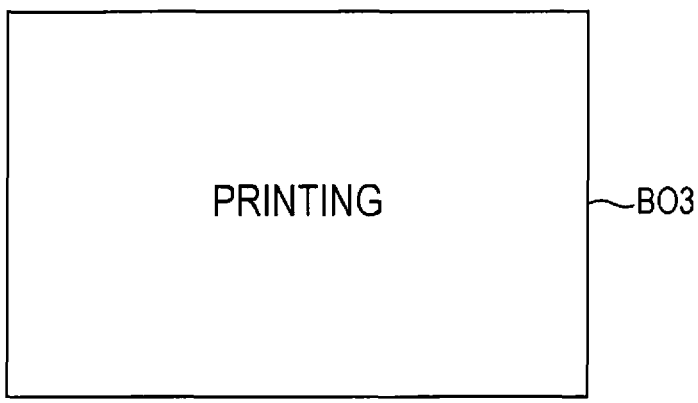
FIG. 8 is a diagram illustrating an example of a screen that is displayed during printing.

The screen illustrated in FIG. 8 is an example of a printing screen BO3 where the print job is selected on the job list screen BO2, and which is displayed while printing is executed by the printing section 21 based on the print job. Such a printing screen BO3 is an external browser screen.

Figure 9:
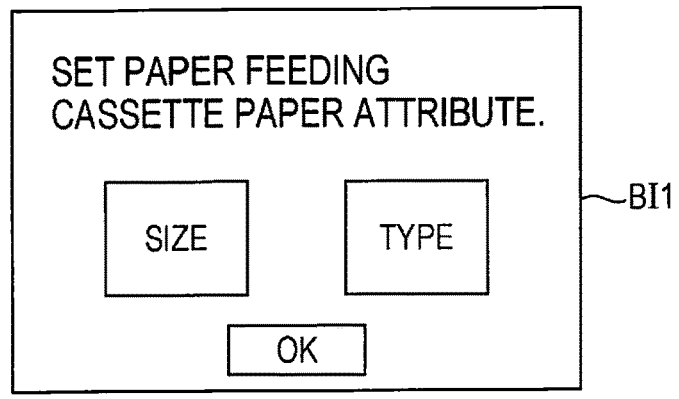
FIG. 9 is a diagram illustrating an example of a screen that prompts setting of an attribute of paper within a paper feeding cassette.
Figure 10:
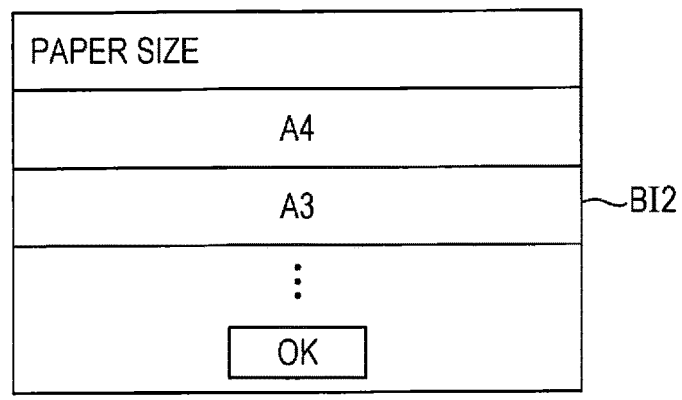
FIG. 10 is a diagram illustrating an example of a screen that prompts setting of the size of paper within the paper feeding cassette.
Figure 11:
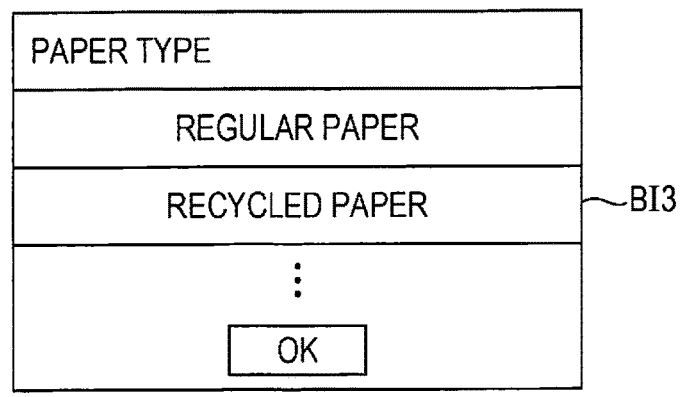
FIG. 11 is a diagram illustrating an example of a screen that prompts setting of the type of paper within the paper feeding cassette.

The screen illustrated in FIG. 9 is an example of a paper sheet attribute setting screen BI1 which is displayed when the paper feeding cassette 84 is detached from the printing section case 81. The paper sheet attribute setting screen BI1 is an internal browser screen. Then, when "size" is selected on the paper sheet attribute setting screen BI1, the screen illustrated in FIG. 10 is displayed on the display section 232. In addition, when "type" is selected on the paper sheet attribute setting screen BI1, the screen illustrated in FIG. 11 is displayed on the display section 232. In addition, when "OK" is selected on the paper sheet attribute setting screen BI1, it is determined that the interrupt display event has ended, and the paper sheet attribute setting screen BI1 is no longer displayed on the display section 232.

The screen illustrated in FIG. 10 is a size setting screen BI2 for setting the size of the paper sheet which is an example of an attribute of the medium. The size setting screen BI2 is an internal browser screen. Then, when "A4"

is selected on the size setting screen BI2, and then "OK" is selected, it is determined that the setting of the size of the paper sheet is complete, and the paper sheet attribute setting screen BI1 is displayed again on the display section 232.

The screen illustrated in FIG. 11 is a type setting screen BI3 for setting the type of the paper sheet which is an example of an attribute of the medium. The type setting screen BI3 is an internal browser screen. Then, when "regular paper" is selected on the type setting screen BI3, and then "OK" is selected, it is determined that the setting of the type of the paper sheet is complete, and the paper sheet attribute setting screen BI1 is displayed again on the display section 232.

Figure 12:
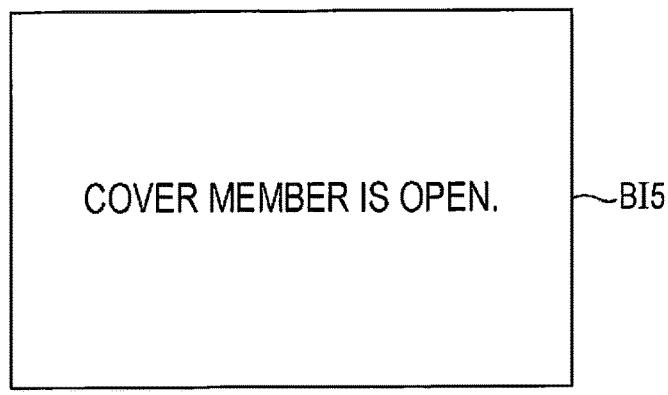
FIG. 12 is a diagram illustrating an example of a screen that notifies that a cover member is not positioned at a shielding position.

The screen illustrated in FIG. 12 is an example of a screen which is displayed when the cover member 82 is not positioned at shielding position. The screen is an example of an open notification screen BI5 for notifying that the cover member 82 is open, and is an internal browser screen. When the cover member 82 returns to the shielding position, it is determined that the interrupt display event has ended, and the open notification screen BI5 is no longer displayed on the display section 232.

Figure 13:
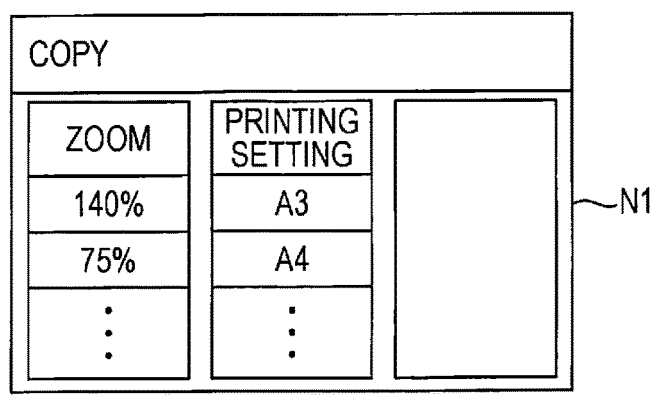
FIG. 13 is a diagram illustrating an example of a screen that prompts selection of various conditions prior to executing copying.

The screen illustrated in FIG. 13 is an example of the screen in a case where "copy" is selected on the process selection screen BO1. The screen is a condition select screen N1 which prompts selection of various conditions (zoom, paper sheet size, and the like) when copying is executed. Here, the condition select screen N1 which prompts selection of execution conditions for process where reception is unnecessary such as copying is a native screen.

Next, an example of the internal browser screen which is displayed on the monitor 121 of the information terminal 12 will be described with reference to FIG. 14.

Figure 14:
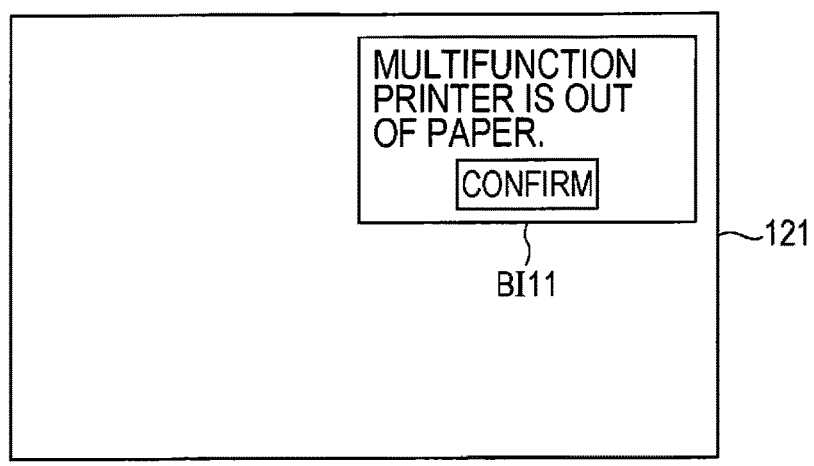
FIG. 14 is a diagram illustrating an example of a screen that provides guidance on the state of the multifunction printer on a monitor of an information terminal.

The screen illustrated in FIG. 14 is an example of a guidance screen BI11 which is displayed when the paper feeding cassette 84 of the multifunction printer 20 is out of paper. The guidance screen BI11 is displayed on the monitor 121 of the information terminal 12 due to the internal browser screen information being received (downloaded) from the multifunction printer 20 by a computer of the information terminal 12. Then, when "confirm" is selected on the monitor 121, such a guidance screen BI11 is no longer displayed on the monitor 121.

Next, a process order of when the paper feeding cassette 84 (an example of the mechanism section) is detached from the printing section case 81 by the user under circumstances in which the external browser screen is displayed on the display section 232 will be described with reference to the flowchart illustrated in FIGS. 15A and 15B.

Figure 15A:
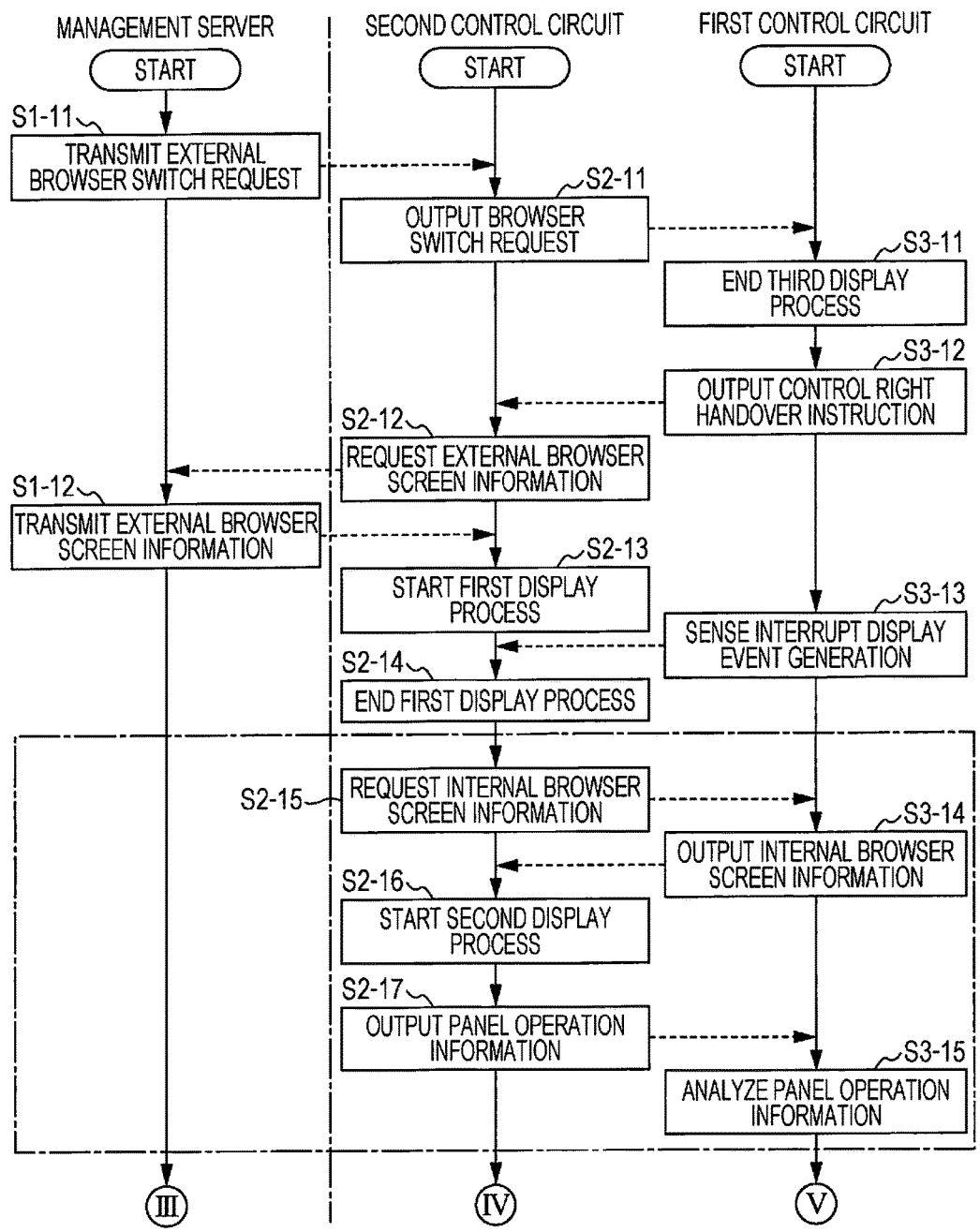
FIGS. 15A and 15B are a flowchart which describes a process procedure when an interrupt display event is generated which is caused by an operation of the paper feeding cassette under circumstances in which an external browser screen is displayed on the display section.
Figure 15B:
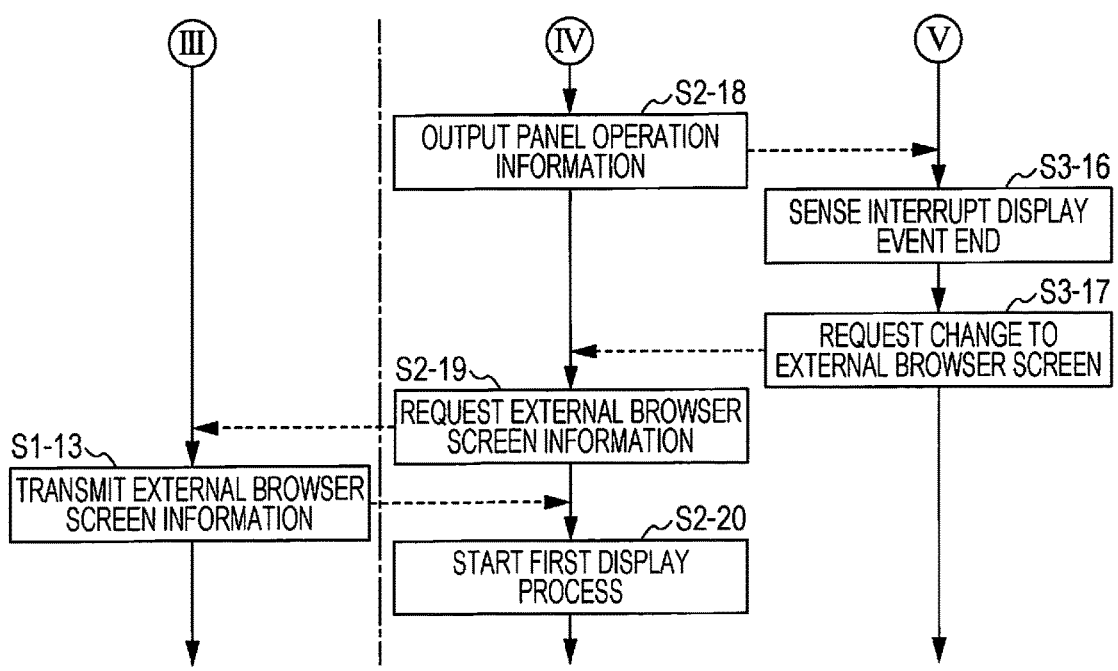

As shown in FIGS. 15A and 15B, when the screen which is displayed on the display section 232 of the multifunction printer 20 is switched from the native screen to the external browser screen, the management server 40 transmits a browser switch request, which is a request to switch from the native screen to the external browser screen, to the multifunction printer 20 (step S1-11). Here, in step S1-11, the external URL of the browser screen (for example, a job list screen B2 illustrated in FIG. 7) which is desired to be displayed by the management server 40 on the display section 232 is transmitted along with the browser switch request.

Then, such a browser switch request and external URL are received by the communication section 95 of the second control circuit 60. By doing this, the communication section 95 of the second control circuit 60 outputs the browser switch request to the control rights management section 933 of the first control circuit 50 (step S2-11). In addition, in the second control circuit 60, the browser switch request and the received external URL are stored in the external URL memory section 935.

Meanwhile, in the first control circuit 50 to which the browser switch request is input, when the instruction which yields the control rights for the display section 232 to the second display control section 934 is output by the control rights management section 933 to the first display control section 931, the first display control section 931 ends the third display process (step S3-11). Subsequently, the control rights management section 933 of the first control circuit 50 outputs the instruction which yields the control rights for the display section 232 to the second display control section 934 to the second display control section 934 of the second control circuit 60 (step S3-12).

Then, in the second control circuit 60, the second display control section 934 requests the external browser screen information which relates to the external browser screen of the external URL that is designated by the management server 40, that is, the latest external URL which is stored in the external URL memory section 935 to the management server 40 (step S2-12). By doing this, the management server 40 transmits the requested external browser screen information to the second control circuit 60 (step S1-12).

Then, in the second control circuit 60, the second display control section 934 receives (downloads) the external browser screen information, and starts the first display process (step S2-13). Thereby, the external browser screen that is based on the received external browser screen information is displayed on the display section 232. That is, when step S2-13 is executed, the screen of the display section 232 is switched from the native screen to the external browser screen. In this point, an example of the "first display step" in which the screen that is based on the external browser screen information which is received from the management server 40 is displayed on the display section 232 in the control device 24 of the multifunction printer 20 is configured by step S2-13.

The user detaches the paper feeding cassette 84 from the printing section case 81 under circumstances in which the external browser screen is displayed on the display section 232 in this manner. In this case, since the signal from the cassette sensor 88 is changed, the event generation section 932 of the first control circuit 50 senses the change in state of the paper feeding cassette 84 which is caused by the operation of the paper feeding cassette 84 by the user, and the interrupt display event is generated according to the change in state of the paper feeding cassette 84 (step S3-13). In this point, an example of the "state change sensing step" in which a change in state of the mechanism section which is caused by an operation of the mechanism section in the control device 24 of the multifunction printer 20 is configured by step S3-13.

Here, in the first control circuit 50, when the interrupt display event is generated by the event generation section 932 according to the operation of the paper feeding cassette 84, the internal browser screen (for example, the paper sheet attribute setting screen BI1 illustrated in FIG. 9) is generated in the internal server 97 according to the generated interrupt display event. Then, the internal URL which corresponds to such an internal browser screen is output to the second control circuit 60 as well as the instruction in which the interrupt display event is generated. Here, the internal URL is stored in the internal URL memory section 936.

By doing this, in the second control circuit 60, the second display control section 934 ends the first display process (step S2-14). Thereby, the external browser screen is no longer displayed on the display section 232. Subsequently, the second display control section 934 requests the internal browser screen information which relates to the internal browser screen of the internal URL designated by the internal server 97 of the first control circuit 50 to the internal server 97 of the first control circuit 50 (step S2-15). By doing this, the internal server 97 of the first control circuit 50 outputs the requested internal browser screen information to the second control circuit 60 (step S3-14). In this point, an example of the "switch step" in which when the change in state of the paper feeding cassette 84 is sensed while the screen that is based on the external browser screen information is displayed on the display section 232 in the control device 24 of the multifunction printer 20, the step switches from the first display process step to the second display process step is configured by steps S2-14, S2-15, and S3-14.

Then, in the second control circuit 60, the second display control section 934 starts the second display process based on the input internal browser screen information (step S2-16). Thereby, the internal browser screen that is based on the input internal browser screen information is displayed on the display section 232. In this point, an example of the "second display step" in which the screen that is based on the internal browser screen information which is generated by the internal server 97 is displayed on the display section 232 in the control device 24 of the multifunction printer 20 is configured by step S2-13.

In this case, the interrupt display event is generated according to the change in state of the paper feeding cassette 84. For this reason, the second display control section 934 displays the paper sheet attribute setting screen BI1 illustrated in FIG. 9 on the display section 232. In this state, when the region of "size" is selected on the paper sheet attribute setting screen BI1 due to the operation of the touch panel 23A by the user, the panel input determination section 92 outputs the panel operation information to the first display control section 931 of the first control circuit 50 (step S2-17). By doing this, in the first control circuit 50, the first display control section 931 analyzes the input panel operation information, and acquires the selection of paper size setting by the user (step S3-15).

Then, in the first control circuit 50, the internal server 97 outputs the internal URL of the size setting screen BI2 illustrated in FIG. 10 to the second display control section 934. Next, the second display control section 934 requests the internal browser screen information of the internal URL which is designated by the internal server 97 to the internal server 97 (step S2-15). Then, when the second display control section 934 inputs the requested internal browser screen information from the internal server 97 (step S3-14), the second display process is executed in which the size setting screen BI2 illustrated in FIG. 10 is displayed on the display section 232 (step S2-16).

In this state, when the region of "A4" is selected on the size setting screen BI2 due to the operation of the touch panel 23A by the user, and then, the region of "OK" is selected, the panel input determination section 92 outputs the panel operation information to the first display control section 931 of the first control circuit 50 (step S2-17). By doing this, in the first control circuit 50, the first display control section 931 analyzes the input panel operation information, and acquires the selection by the user of "A4" as the size of the paper sheet (step S3-15).

Then, in the first control circuit 50, the internal server 97 outputs the internal URL of the paper sheet attribute setting screen BI1 illustrated in FIG. 9 to the second display control section 934. Next, the second display control section 934 requests the internal browser screen information of the internal URL which is designated by the internal server 97 to the internal server 97 (step S2-15). Then, when the second display control section 934 inputs the requested internal browser screen information from the internal server 97 (step S3-14), the paper sheet attribute setting screen BI1 illustrated in FIG. 9 is displayed on the display section 232 (step S2-16).

In this state, when the region of "type" is selected on the paper sheet attribute setting screen BI1 due to the operation of the touch panel 23A by the user, the panel input determination section 92 outputs the panel operation information to the first display control section 931 of the first control circuit 50 (step S2-17). By doing this, in the first control circuit 50, the first display control section 931 analyzes the input panel operation information, and acquires the selection of paper type setting by the user (step S3-15).

Then, in the first control circuit 50, the internal server 97 outputs the internal URL of the type setting screen BI3 illustrated in FIG. 11 to the second display control section 934. Next, the second display control section 934 requests the internal browser screen information of the internal URL which is designated by the internal server 97 to the internal server 97 (step S2-15). Then, when the second display control section 934 inputs the requested internal browser screen information from the internal server 97 (step S3-14), the type setting screen BI3 illustrated in FIG. 11 is displayed on the display section 232 (step S2-16).

In this state, when the region of "regular paper" is selected on the type setting screen BI3, and then, the region of "OK" is selected due to the operation of the touch panel 23A by the user, the panel input determination section 92 outputs the panel operation information to the first display control section 931 of the first control circuit 50 (step S2-17). By doing this, in the first control circuit 50, the first display control section 931 analyzes the input panel operation information, and acquires the selection of "regular paper" as the type of paper sheet by the user (step S3-15).

Then, in the first control circuit 50, the internal server 97 outputs the internal URL of the paper sheet attribute setting screen BI1 illustrated in FIG. 9 to the second display control section 934. Next, the second display control section 934 requests the internal browser screen information of the internal URL which is designated by the internal server 97 to the internal server 97 (step S2-15). Then, when the second display control section 934 inputs the requested internal browser screen information from the internal server 97 (step S3-14), the paper sheet attribute setting screen BI1 illustrated in FIG. 9 is displayed on the display section 232 (step S2-16).

When the touch panel 23A is operated under circumstances in which such an internal browser screen is displayed on the display section 232, each step is repeated in the region which is illustrated by the dashed line in FIG. 15A.

In this state, when the region of "OK" is selected on the paper sheet attribute setting screen BI1 due to the operation of the touch panel 23A by the user, the panel input determination section 92 outputs the panel operation information to the first display control section 931 of the first control circuit 50 (step S2-18). By doing this, in the first control circuit 50, the first display control section 931 analyzes the input panel operation information, and senses that the setting of the attribute of the paper sheet is completed by the user, that is, that the interrupt display event has ended (step S3-16).

Next, in the first control circuit 50, the event generation section 932 requests switching from the internal browser screen to the external browser screen to the second display control section 934 of the second control circuit 60 (step S3-17).

Then, when such a request in input, the second display control section 934 of the second control circuit 60 ends the second display process, and requests the external browser screen information which relates to the external browser screen of the latest external URL that is stored in the external URL memory section 935 to the management server 40 (step S2-19). By doing this, the management server 40 transmits the requested external browser screen information to the second control circuit 60 (step S1-13).

Then, in the second control circuit 60, the second display control section 934 receives (downloads) the browser screen information, and starts the first display process (step S2-20). Thereby, the external browser screen that is based on the received external browser screen information is displayed on the display section 232. At this time, in a case where the external URL which is read from the external URL memory section 935 is the same as the external URL of the external browser screen which is displayed on the display section 232 directly prior to the end of the first display process of step S2-14, the screen of the display section 232 returns to the screen directly prior to the generation of the interrupt display event due to being switched from the second display process to the first display process.

Next, a process order of when the cover member 82 is displaced from the shielding position due to the operation by the user under circumstances in which the external browser screen is displayed on the display section 232 will be described with reference to the flowchart illustrated in FIG. 16.

Figure 16:
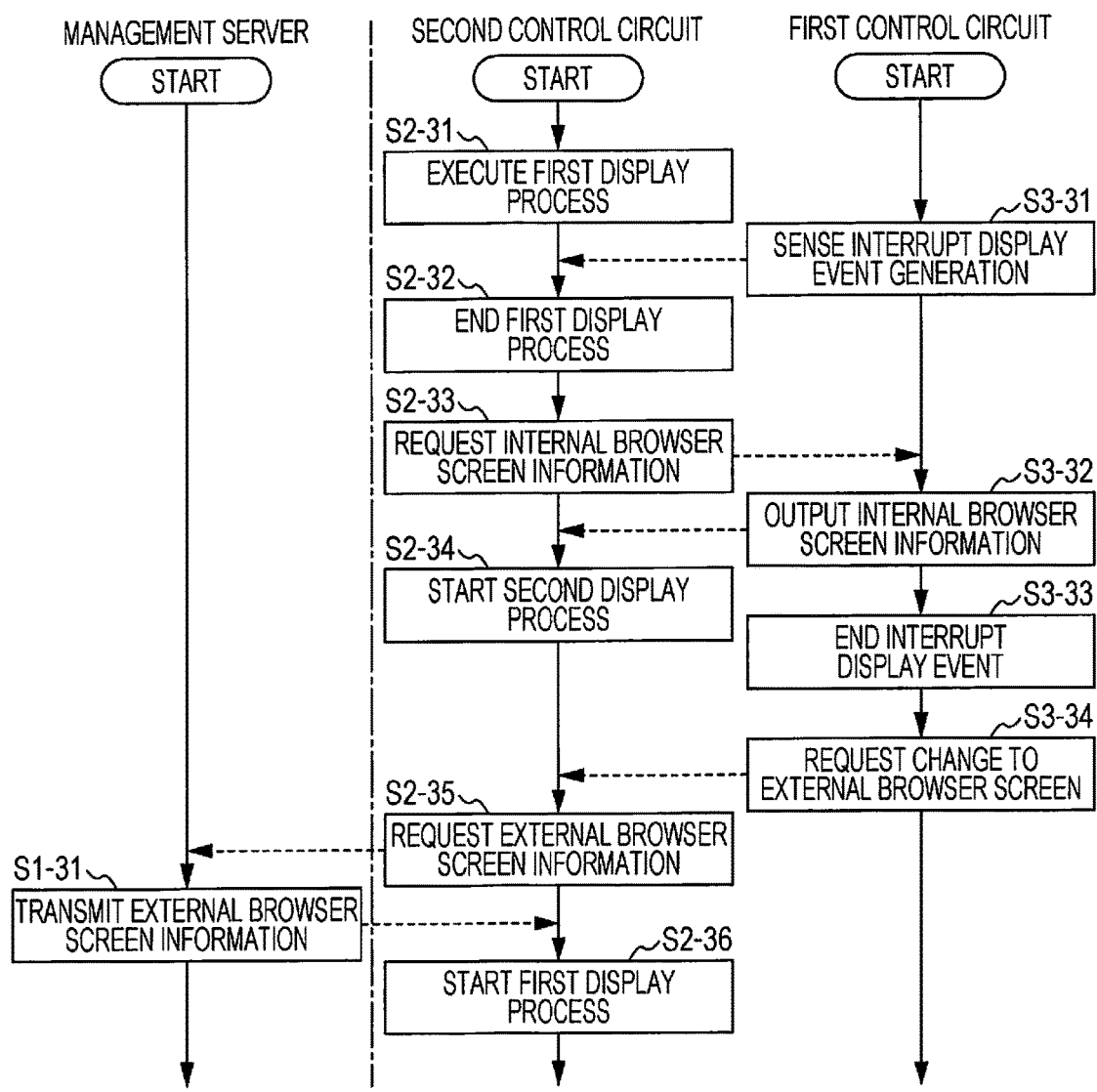
FIG. 16 is a flowchart which describes a process procedure when an interrupt display event is generated which is caused by an operation of the cover member under circumstances in which an external browser screen is displayed on the display section.

As shown in FIG. 16, the second display control section 934 of the second control circuit 60 executes the first display process in which the external browser screen that is based on the external browser screen information which is received (downloaded) from the management server 40 is displayed on the display section 232 (step S2-31). In this point, an example of the "first display step" is configured by step S2-31.

The cover member 82 is displaced from the shielding position under circumstances in which the external browser screen is displayed on the display section 232 in this manner. In this case, since the signal from the cover sensor 89 is changed, the event generation section 932 of the first control circuit 50 senses the change in state of the cover member 82 which is caused by the operation of the cover member 82 by the user, and the interrupt display event is generated according to the change in state of the cover member 82 (step S3-31). In this point, an example of the "state change sensing step" is configured by step S3-31.

Here, in the first control circuit 50, when the interrupt display event is generated by the event generation section 932 according to the operation of the cover member 82, the internal browser screen (the open notification screen BI5 illustrated in FIG. 12) is generated in the internal server 97 according to the generated interrupt display event. Then, the internal URL which corresponds to such an internal browser screen is output to the second display control section 934 as well as the instruction in which the interrupt display event is generated.

By doing this, in the second control circuit 60, the second display control section 934 ends the first display process (step S2-32). Thereby, the external browser screen is no longer displayed on the display section 232. Subsequently, the second display control section 934 requests the internal browser screen information which relates to the internal browser screen of the internal URL designated by the internal server 97 of the first control circuit 50 to the internal server 97 of the first control circuit 50 (step S2-33). By doing this, the internal server 97 of the first control circuit 50 outputs the requested internal browser screen information to the second control circuit 60 (step S3-32). In this point, an example of the "switch step" in which when the change in state of the cover member 82 is sensed while the screen that is based on the external browser screen information is displayed on the display section 232 in the control device 24 of the multifunction printer 20, the step switches from the first display process step to the second display process step is configured by steps S2-32, S2-33, and S3-32.

Then, in the second control circuit 60, the second display control section 934 starts the second display process based on the input internal browser screen information (step S2-34). Thereby, the internal browser screen that is based on the input internal browser screen information is displayed on the display section 232. In this case, the interrupt display event is generated according to the change in state of the cover member 82. For this reason, the second display control section 934 displays the open notification screen BI5 illustrated in FIG. 12 on the display section 232. In this point, an example of the "second display step" is configured by step S2-34.

In this state, when the cover member 82 returns to the shielding position, since the signal from the cover sensor 89 changes, the event generation section 932 of the first control circuit 50 ends the interrupt display event (step S3-33). By doing this, the control rights management section 933 requests switching from the internal browser screen to the external browser screen to the second display control section 934 of the second control circuit 60 (step S3-34).

Then, the second display control section 934 of the second control circuit 60 ends the second display process, and requests the external browser screen information which relates to the external browser screen of the latest external URL that is stored in the external URL memory section 935 to the management server 40 (step S2-35). By doing this, the management server 40 transmits the requested external browser screen information to the second control circuit 60 (step S1-31).

Then, in the second control circuit 60, the second display control section 934 receives (downloads) the browser screen information, and starts the first display process (step S2-36). Thereby, the external browser screen that is based on the received external browser screen information is displayed on the display section 232. At this time, in a case where the external URL which is read from the external URL memory section 935 is the same as the external URL of the external browser screen which is displayed on the display section 232 directly prior to the first display process of step S2-31 ends, the screen of the display section 232 returns to the screen directly prior to the generation of the interrupt display event due to being switched from the second display process to the first display process.

Next, a process order of when the cover member 82 is displaced from the shielding position due to the operation by the user under circumstances in which the native screen is displayed on the display section 232 will be described with reference to the flowchart illustrated in FIG. 17.

Figure 17:
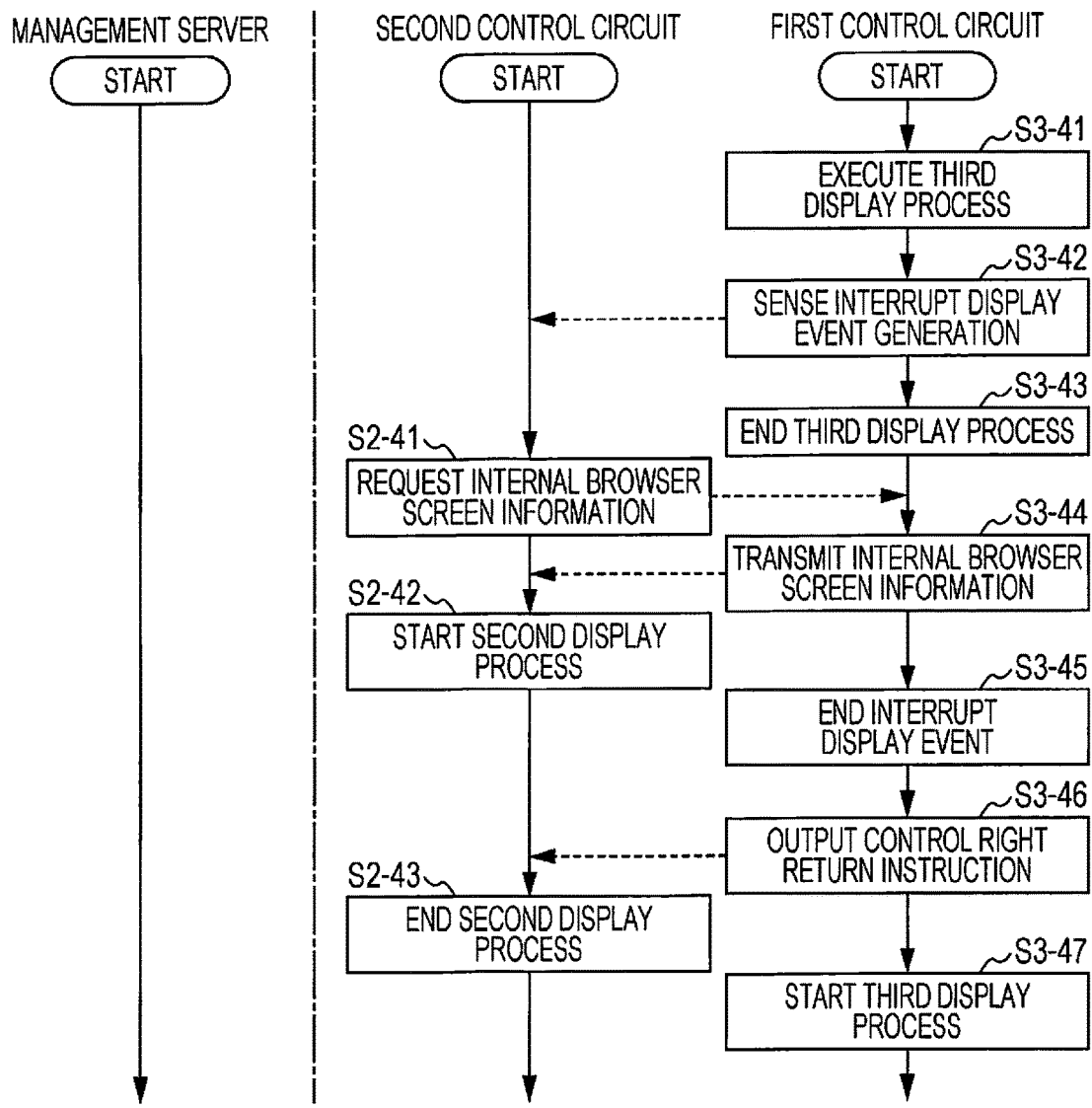
FIG. 17 is a flowchart which describes a process procedure when an interrupt display event is generated which is caused by an operation of the cover member under circumstances in which a native screen is displayed on the display section.
Figure 18:
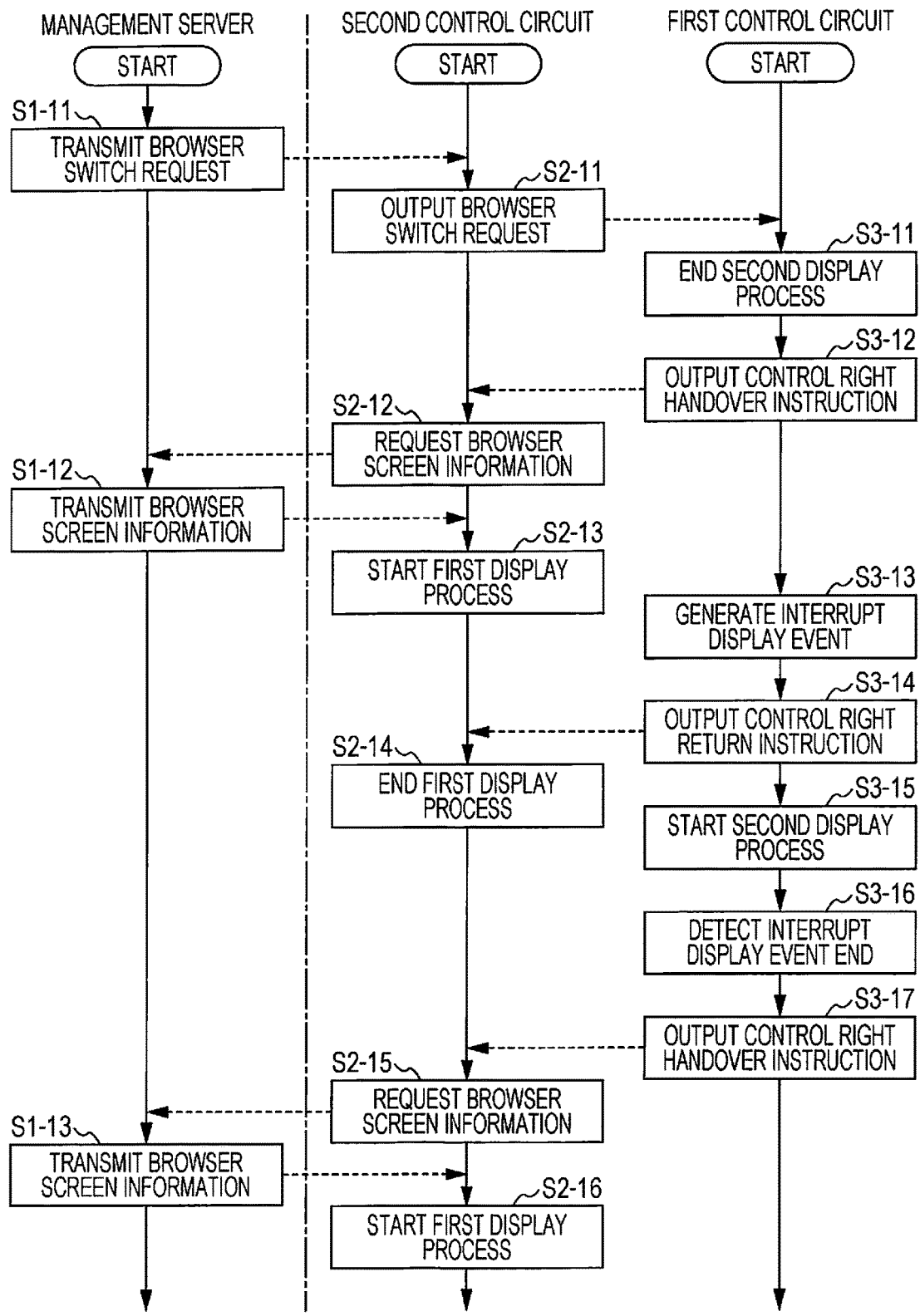
FIG. 18 is a flowchart which describes a process procedure of a second embodiment.

As shown in FIG. 17, the first display control section 931 of the first control circuit 50 executes the third display process in which the native screen that is based on the native screen information which is read from the native screen memory section 94 is displayed on the display section 232 (step S3-41).

The cover member 82 is displaced from the shielding position under circumstances in which the native screen is displayed on the display section 232 in this manner. In this case, since the signal from the cover sensor 89 is changed, the event generation section 932 of the first control circuit 50 senses the change in state of the cover member 82 which is caused by the operation of the cover member 82 by the user, and the interrupt display event is generated according to the change in state of the cover member 82 (step S3-42). In this point, an example of the "state change sensing step" in which a change in state of the mechanism section which is caused by an operation of the mechanism section in the control device 24 of the multifunction printer 20 is configured by step S3-42.

Here, in the first control circuit 50, when the interrupt display event is generated by the event generation section 932 according to the operation of the cover member 82, the internal browser screen (the open notification screen BI5 illustrated in FIG. 12) is generated in the internal server 97 according to the generated interrupt display event. Then, the internal URL which corresponds to such an internal browser screen is output to the second display control section 934 as well as the instruction in which the interrupt display event is generated. By doing this, the first display control section 931 of the first control circuit 50 ends the third display process (step S3-43). Thereby, the native screen is no longer displayed on the display section 232.

Meanwhile, in the second control circuit 60, the second display control section 934 requests the internal browser screen information which relates to the internal browser screen of the internal URL designated by the internal server 97 of the first control circuit 50 to the internal server 97 of the first control circuit 50 (step S2-41). By doing this, the internal server 97 of the first control circuit 50 outputs the requested internal browser screen information to the second control circuit 60 (step S3-44).

Then, in the second control circuit 60, the second display control section 934 starts the second display process based on the input internal browser screen information (step S2-42). The internal browser screen is displayed on the display section 232 based on the input internal browser screen information due to the display process being switched from the third display process to the second display process in this manner. In this case, the interrupt display event is generated according to the change in state of the cover member 82. For this reason, the second display control section 934 displays the open notification screen BI5 illustrated in FIG. 12 on the display section 232. In this point, an example of the "second display step" is configured by step S2-42.

In this state, when the cover member 82 returns to the shielding position, since the signal from the cover sensor 89 changes, the event generation section 932 of the first control circuit 50 ends the interrupt display event (step S3-45). By doing this, the control rights management section 933 outputs the instruction which returns the control rights for the display section 232 from the second display control section 934 to the first control circuit 50 to the second control circuit 60 (step S3-46).

Then, in the second control circuit 60, the second display control section 934 ends the second display process (step S2-43). Meanwhile, in the first control circuit 50, the first display control section 931 starts the third display process (step S3-47). Thereby, the native screen before generation of the interrupt display event is displayed on the display section 232.

According to the embodiment, it is possible to obtain the effects as above.

(1) The display process is switched from the first display process to the second display process when the change in state of the mechanism section is sensed, which is caused by an operation of the mechanism section by the user under circumstances in which the external browser screen that is based on external browser screen information is displayed on the display section 232. By doing this, the screen that is based on the internal browser screen information which relates to the internal browser screen according to the aspect of the change in state of the mechanism section is interruptedly displayed on the display section 232. Accordingly, when the mechanism section is operated by the user, it is possible to display a screen on the display section 232 according to the aspect of the change in state of the mechanism section at that time.

(2) Here, in the embodiment, when the change in state of the operation section such as the paper feeding cassette 84 and the cover member 82 are sensed by the multifunction printer 20, even if the management server 40 does not sense the change in state of the operation section, the internal browser screen is displayed on the display section 232 according to the change in state of the mechanism section at that time. Accordingly, even if the management server 40 does not monitor the change in state of the multifunction printer 20 due to polling being executed, when the state of the operation section is changed, it is possible to display the screen on the display section 232 according to the change in state of the mechanism section at that time.

(3) Here, when the change in state of the multifunction printer 20 is monitored by the management server 40 by executing polling, and the change in state of the operation section is sensed by the management server 40, a case where display content of the display section 232 of the multifunction printer 20 is changed by the management server 40 is set as a comparative example. In the comparative example, a delay occurs in change to the display content on the display section 232 of the multifunction printer 20 to the extent that the deviation between a timing at which the state of the operation section is changed caused by the operation of the operation section by the user and a timing at which the change in state of the operation section due to polling being executed is sensed by the management server 40 is large. In this point, in the embodiment, it is possible to change the display content on the display section 232 without the change in state of the operation section being sensed by the management server 40. For this reason, in comparison to the case of the comparative example, when the state of the operation section is changed, it is possible to quickly change the display content on the display section 232.

(4) For example, when the paper feeding cassette 84 is operated by the user, there is a possibility that the attribute of the paper sheet P which is accommodated in the paper feeding cassette 84 is changed. For this reason, in the embodiment, when the interrupt display event is generated which is caused by the operation of the paper feeding cassette 84 by the user under circumstances in which the external browser screen is displayed on the display section 232, the paper sheet attribute setting screen BI1 for setting the attribute of the paper sheet P are interruptedly displayed on the display section 232. Then, it is possible to set the attribute of the paper sheet P of the paper feeding cassette 84 to the user by the paper sheet attribute setting screen BI1 being displayed on the display section 232.

(5) In addition, for example, when an interrupt display event is generated which is caused by displacement of the cover member 82 from the shielding position under circumstances in which the external browser screen is displayed on the display section 232, the open notification screen BI5 is displayed on the display section 232 according to the state of the cover member 82.

(6) In a case where the cover member 82 does not completely return to the shielding position, since it is determined that the interrupt display event has not ended, the open notification screen BI5 continues to be displayed on the display section 232. For this reason, it is possible to suppress the user from forgetting to close the cover member 82.

(7) Here, the external URL which is designated by the management server 40 is stored in external URL memory section 935. For this reason, when the display process is switched from the first display process to the second display process caused by the generation of the interrupt display event, and then, the interrupt display event ends and first display process is resumed, it is possible to display the external browser screen of the external URL on the display section 232 by reading the latest external URL which is stored in the external URL memory section 935. That is, when the interrupt display event ends, even if the external URL is not newly received from the management server 40, it is possible to display the external browser screen that was displayed on the display section 232 directly prior to generation of the interrupt display event again on the display section 232.

(8) In addition, in the embodiment, the internal browser screen is displayed on the display section 232 according to the change in state of the mechanism section even when the interrupt display event is generated which is caused by the change in state of the mechanism section such as the cover member 82 and the paper feeding cassette 84 under circumstances in which the native screen is displayed on the display section 232. Accordingly, even when the mechanism section is operated by the user under circumstances in which the native screen is displayed on the display section 232, it is possible to quickly display the internal browser screen on the display section 232 according to the aspect of the change in state of the mechanism section at that time.

Next, embodiment 2 will be described according to FIG. 19. In the first embodiment, the second display control is performed by displaying a web page which is output by the internal server 97 using the internal browser, but in the second embodiment, the second display control is performed by displaying screen information which is stored in the native screen memory section 94. Here, detailed description of the configuration of the second embodiment which overlaps with the first embodiment will be omitted.

Next, a process order of when the paper feeding cassette 84 (an example of the mechanism section) is detached from the printing section case 81 by the user, and the paper sheet size and type which are set in the paper feeding cassette 84 will be described with reference to the flowchart illustrated in FIG. 13.

As shown in FIG. 13, when the screen which is displayed on the display section 232 of the multifunction printer 20 is switched from the native screen to the browser screen, the management server 40 transmits a browser switch request which is a request to switch from the native screen to the browser screen to the multifunction printer 20 (step S1-11). Here, in step S1-11, the URL of the browser screen (for example, the job list screen B2 illustrated in FIG. 7) which is desired to be displayed by the management server 40 on the display section 232 is transmitted along with the browser switch request.

Then, such a browser switch request and external URL are received by the communication section 95 of the second control circuit 60. By doing this, the communication section 95 of the second control circuit 60 outputs the browser switch request to the control rights management section 933 of the first control circuit 50 (step S2-11). In addition, in the second control circuit 60, the browser switch request and the received URL are stored in the URL memory section 935.

Meanwhile, in the first control circuit 50 to which the browser switch request is input, when the instruction which yields the control rights for the display section 232 to the second display control section 934 is output by the control rights management section 933 to the first display control section 931, the first display control section 931 ends the second display process (step S3-11). Subsequently, the control rights management section 933 of the first control circuit 50 outputs the instruction which yields the control rights for the display section 232 to the second display control section 934 to the second display control section 934 of the second control circuit 60 (step S3-12).

Then, in the second control circuit 60, the second display control section 934 requests the browser screen information which relates to the browser screen of the URL which is designated by the management server 40, that is, the latest URL which is stored in the URL memory section 935 to the management server 40 (step S2-12). By doing this, the management server 40 transmits the requested browser screen information to the second control circuit 60 (step S1-12).

Then, in the second control circuit 60, the second display control section 934 receives (downloads) the browser screen information, and starts the first display process (step S2-13). Thereby, the browser screen that is based on the received browser screen information is displayed on the display section 232. That is, when step S2-13 is executed, the screen of the display section 232 is switched from the native screen to the browser screen. In this point, an example of the "first display process step" in which the screen that is based on the browser screen information which is received from the management server 40 is displayed on the display section 232 in the control device 24 of the multifunction printer 20 is configured by step S2-13.

The user detaches the paper feeding cassette 84 from the printing section case 81 under circumstances in which the browser screen is displayed on the display section 232 in this manner. In this case, since the signal from the cassette sensor 88 is changed, the event generation section 932 of the first control circuit 50 senses the change in state of the paper feeding cassette 84 which is caused by the operation of the paper feeding cassette 84 by the user, and the interrupt display event is generated which is caused by the change in state of the paper feeding cassette 84 (step S3-13). In this point, an example of the "state change sensing step" in which a change in state of the mechanism section which is caused by an operation of the mechanism section in the control device 24 of the multifunction printer 20 is configured by step S3-13.

By doing this, in the first control circuit 50, the control rights management section 933 outputs the instruction which returns the control rights for the display section 232 to the first display control section 931 to the second display control section 934 of the second control circuit 60 (step S3-14). That is, an example of the "switch step" in which when the operation of the mechanism section is sensed in the operation sensing step (step S3-13) while the browser screen is displayed on the display section 232, the process is switched from the first display process to the second display process is configured by step S3-14.

Then, in the second control circuit 60, the first display control section 931 ends the first display process (step S2-14). Thereby, the browser screen is no longer displayed on the display section 232.

When the first display process ends in this manner, in the first control circuit 50, the first display control section 931 starts the second display process since the instruction which returns the control rights for the display section 232 to the second display control section 934 is input from the control rights management section 933 (step S3-15). In detail, the second display control section 934 reads the native screen information from the native screen memory section 94 according to the generated interrupt display event, and the native screen that is based on the read native screen information is displayed on the display section 232. That is, when the change in state of the mechanism section is sensed while the first display process is executed, the UI control section 93 switches the display process from the first display process to the second display process, and the screen that is based on the native screen information which relates to the screen according to the aspect of the change in state of the mechanism section is displayed on the display section 232. In this point, an example of the "second display process step" in which the screen that is based on the native screen information which is stored in the native screen memory section 94 is displayed on the display section 232 in the control device 24 of the multifunction printer 20 is configured by step S3-15.

In this case, the interrupt display event is generated caused by the change in state of the paper feeding cassette 84. For this reason, the second display control section 934 displays a paper sheet attribute setting screen N1 illustrated in FIG. 9 on the display section 232 by reading the native screen information used during operation of the paper feeding cassette 84 by the user from the native screen memory section 94. In this state, when the region of "size" is selected by the user on the paper sheet attribute setting screen N1, the second display control section 934 reads the native screen information for setting the size from the native screen memory section 94, and displays a size setting screen N2 illustrated in FIG. 10 on the display section 232. Then, when the paper sheet size (for example, "A4") is set on the size setting screen N2, and the region of "OK" is selected, the second display control section 934 displays the paper sheet attribute setting screen N1 illustrated in FIG. 9 on the display section 232 by reading the native screen information used during operation of the paper feeding cassette 84 by the user from the native screen memory section 94. Next, when the region of "type" is selected on the paper sheet attribute setting screen N1, the second display control section 934 reads the native screen information for setting the type from the native screen memory section 94, and displays a type setting screen N3 illustrated in FIG. 11 on the display section 232. Then, when the paper sheet type (for example, "regular paper") is set on the type setting screen N3, and the region of "OK" is selected, the second display control section 934 displays the paper sheet attribute setting screen N1 illustrated in FIG. 9 on the display section 232 by reading the native screen information used during operation of the paper feeding cassette 84 by the user from the native screen memory section 94.

In this state, when the region of "OK" on the paper sheet attribute setting screen N1 is selected, since it is determined that the setting of the paper sheet attribute is complete, the second display control section 934 senses that the interrupt display event has ended (step S3-16). By doing this, in the first control circuit 50, the control rights management section 933 outputs the instruction which yields the control rights for the display section 232 to the first display control section 931 to the second display control section 934 of the second control circuit 60 (step S3-17). In addition, in the first control circuit 50, in the first display control section 931, the instruction which yields the control rights for the display section 232 to the first display control section 931 is input from the control rights management section 933. By doing this, the second display control section 934 ends the second display process.

Meanwhile, in the second control circuit 60, the first display control section 931 requests the browser screen information which relates to the latest URL browser screen that is stored in the URL memory section 935 to the management server 40 (step S2-15). By doing this, the management server 40 transmits the requested browser screen information to the second control circuit 60 (step S1-13).

Then, in the second control circuit 60, the first display control section 931 receives (downloads) the browser screen information, and starts the first display process (step S2-16). Thereby, the browser screen that is based on the received browser screen information is displayed on the display section 232. At this time, in a case where the URL which is read from the URL memory section 935 is the same as the URL of the browser screen which is displayed on the display section 232 directly prior to the first display process of step S2-13 ends, the screen of the display section 232 returns to the screen directly prior to the generation of the interrupt display event due to the first display process being started in the step S2-16.

Here, in addition to during sensing of the change in state of the paper feeding cassette 84, the interrupt display event is also generated at the time of displacement from the shielding position of the cover member 82. That is, for example, when the position of the cover member 82 changes from the shielding position to the opening position caused by the operation of the cover member 82, since the signal from the cover sensor 89 is changed, the event generation section 932 of the first control circuit 50 generates the interrupt display event (step S3-13).

By doing this, in the first control circuit 50, the control rights management section 933 outputs the instruction which returns the control rights for the display section 232 to the second display control section 934 to the first display control section 931 of the second control circuit 60 (step S3-14). By doing this, in the second control circuit 60, the first display control section 931 ends the first display process (step S2-14). By doing this, in the first control circuit 50, the second display control section 934 starts the second display process (step S3-15).

That is, when the display process is switched from the first display process to the second display process, the second display control section 934 displays an open notification screen N4 illustrated in FIG. 12 on the display section 232. In this state, when the cover member 82 returns to the shielding position due to the user operation, since the signal from the cover sensor 89 changes, the event generation section 932 of the first control circuit 50 ends the interrupt display event. By doing this, the second display control section 934 senses the end of the interrupt display event (step S3-16). Subsequently, in the first control circuit 50, the control rights management section 933 outputs the instruction which yields the control rights for the display section 232 to the first display control section 931 to the first display control section 931 of the second control circuit 60 (step S3-17). Here, since the flow of the process below is the same as in the case where the paper feeding cassette 84 is operated, the description is omitted.

The operation of the paper feeding cassette 84 and the operation of the cover member 82 are operations which are performed by the user, and are difficult for the management server 40 to predict. For this reason, in the multifunction printer 20 of the embodiment, when the change in state of the paper feeding cassette 84 and the cover member 82 which are caused by the operation of the paper feeding cassette 84 and the cover member 82 are sensed, the native screen is interruptedly displayed on the display section 232 according to aspect of the change in state of the paper feeding cassette 84 and the cover member 82.

According to the second embodiment described above, other than the effects which are obtained by the first embodiment, it is possible to obtain the effects illustrated below.

(9) In the second embodiment, when the interrupt display event is generated under circumstances in which the browser screen is displayed on the display section 232, the display process is switched from the first display process to the second display process. By doing this, the native screen information which relates to the screen according to the aspect of the change in state of the mechanism section is read from the native screen memory section 94, and the native screen information that is based on the native screen information is displayed on the display section 232. Accordingly, when the mechanism section is operated by the user, it is possible to quickly display the native screen on the display section 232 according to the aspect of the change in state of the mechanism section at that time.

Here, the embodiments may be modified as below.

When the display process is switched from the first display process to the second display process due to the generation of the interrupt display event, the latest external URL which is designated by the management server 40 may be stored on the multifunction printer 20 side. At this time, when the second display process ends, and the first display process is resumed, the external URL may be retransmitted from the management server 40, the screen information which is related to the external browser screen of the external URL may be received, and the external browser screen that is based on the external browser screen information may be displayed on the display section 232.

When the display process is switched from the first display process to the second display process due to the generation of the interrupt display event, the information which is related to the external browser screen that is displayed on the display section 232 due to the first display process may be stored in the predetermined memory section. At this time, when the second display process ends, and the first display process is resumed, the external browser screen information may be read from the predetermined memory section, and the browser screen that is based on the external browser screen information may be displayed on the display section 232.

In a case where only the paper sheet size is settable as the attribute of the paper sheet, when the interrupt display event is generated caused by the operation of the paper feeding cassette 84 by the user, the size setting screen BI2 illustrated in FIG. 10 may be displayed on the display section 232.

In a case where only the paper sheet type is settable as the attribute of the paper sheet, when the interrupt display event is generated caused by the operation of the paper feeding cassette 84 by the user, the type setting screen BI3 illustrated in FIG. 11 may be displayed on the display section 232.

In the embodiments, when the touch panel 23A is operated under circumstances in which the internal browser screen is displayed on the display section 232, the panel operation information is output from the second control circuit 60 to the first control circuit 50. However, the invention is not limited thereto, and when the touch panel 23A is operated under circumstances in which the internal browser screen is displayed on the display section 232, the panel operation information may be transmitted from the second control circuit 60 to the management server 40. In this case, analysis of the panel operation information is performed by the management server 40 without using the first control circuit 50.

For example, when the change in state of the paper feeding cassette 84 is sensed under circumstances in which the external browser screen is displayed on the display section 232, and the paper sheet attribute setting screen BI1 (refer to FIG. 9) which is an example of the internal browser screen is displayed on the display section 232, the panel operation information is transmitted from the second control circuit 60 to the management server 40 when the touch panel 23A is operated by the user. In this case, the panel operation information is analyzed by the management server 40, and the analysis result is transmitted from the management server 40 to the second control circuit 60. Such an analysis result is output from the second control circuit 60 to the first control circuit 50. Thereby, the internal browser screen is prepared according to the analysis result, and the display content of the display section 232 is modified by the second control circuit 60 due to the internal server function of the first control circuit 50. Then, when it is determined that the setting of the paper sheet attribute is complete, the modification from the internal browser screen to the external browser screen is requested from the first control circuit 50 with respect to the second control circuit 60.

In the embodiments, the interrupt display event is generated at timing at which the paper feeding cassette 84 is detached from the printing section case 81, but the interrupt display event may be generated at a timing at which the detached paper feeding cassette 84 is mounted to the printing section case 81.

The cover member which is an example of the mechanism section may be configured so as to be slide movable with respect to the multifunction printer 20, and may be configured so as to be removable from the main body of the multifunction printer 20.

As long as the mechanism section is configured so as to be displaceable with respect to the main body of multifunction printer 20, the mechanism section may be another mechanism section other than the paper feeding cassette 84 and the cover member 82. For example, it is possible to give examples such as a case which accommodates an ink tank, and a cover member of the case as such another mechanism section. In addition, other than the printing section case 81 of the printing section 21, the mechanism section may be a mechanism section which is provided in a scan section case of the scan section 22.

As long as the electronic apparatus which configures the management system has the display section 232, the electronic apparatus may be an electronic apparatus other than the multifunction printer. For example, the electronic apparatus may be a printer which is able to execute only printing, may be a copier which is able to execute only a copying function, and may be a scanner which is able to execute only a scanning function.

Next, technical concepts which are able to be ascertained from the embodiments above and other embodiments are noted below.

(i) It is preferable that the mechanism section be configured so as to be displaceable with respect to the main body of the electronic apparatus.

(ii) It is preferable that the internal server information is screen information for displaying on the display section of the information terminal which communicates with the electronic apparatus, and that the screen that is based on the internal server screen information is displayed on the display section of the information terminal by the internal server information being transmitted to the information terminal.

According to the configurations above, it is possible to control the display content on the display section of the electronic apparatus when the change in state of the mechanism section is sensed by using the internal server which generates the internal server screen information for displaying on the display section of the information terminal.

(iii) When the display control section executes the first display process, it is preferable that the screen is requested according to external access information which is designated by the external server, and that the screen that is based on the external server information received from the external server according to the request is displayed on the display section.

What is claimed is:

1. An electronic apparatus which is able to communicate with an external server via a network, comprising:
    a communication interface which receives external server screen information from the external server, the external server screen information being screen information of an operation screen for controlling the electronic apparatus by a user operation;
    a printing section which executes printing on a medium;
    an operable mechanism which accommodates the medium prior to printing, and includes a medium accommodating section which is attachable and detachable with respect to a main body of the electronic apparatus;
    a state change sensing circuit which senses a change in state of the operable mechanism which is caused by an operation of the operable mechanism;
    a display which displays a screen;
    an internal screen information output circuit which outputs internal screen information that is screen information which relates to the screen that is displayed on the display, the internal screen information being received from an internal server and not being received from the external server, the internal screen information being screen information of a setting screen for setting the operable mechanism whose change in state is sensed;
    a memory which stores the internal screen information in advance; and
    a display control circuit which executes a first display process in which a first screen that is based on the external server screen information which is received from the external server is displayed on the display and a second display process in which a second screen that is based on the internal screen information which is received from the internal server is displayed on the display,
    wherein the display control circuit switches from the first display process to the second display process such that the display control circuit ends the first display process to end displaying of the first screen and starts the second display process to display the second screen that is based on the internal screen information which relates to a screen for setting an attribute of the medium that is set in the medium accommodating section on the display upon the change in state of the operable mechanism being sensed by the state change sensing circuit while executing the first display process.

2. The electronic apparatus according to claim 1,
wherein the operable mechanism includes a cover member, the cover member is configured such that displacement is possible between a shielding position for covering an inner section of the electronic apparatus and an opening position for exposing the inner section of the electronic apparatus to the outside, and
the display control circuit switches from the first display process to the second display process, and displays the screen that is based on the internal screen information which relates to the screen according to the change in position of the cover member on the display when the change in the position of the cover member from the shielding position is sensed by the state change sensing circuit while executing the first display process.

3. The electronic apparatus according to claim 1,
wherein the internal screen information output circuit is provided inside the electronic apparatus, and is an internal server which outputs a web page of the internal screen information.

4. The electronic apparatus according to claim 3, further comprising:
    a native screen memory section which stores native screen information that is screen information which relates to the screen that is displayed on the display,
    wherein the display control circuit executes a third display process in which a screen that is based on the native screen information which is read out from the native screen memory section is displayed on the display, and
    the display control circuit switches from the third display process to the second display process and displays a screen that is based on the internal screen information on the display when the change in state of the operable mechanism is sensed by the state change sensing circuit while executing the third display process.

5. The electronic apparatus according to claim 3,
wherein the internal server designates the internal access information with respect to the display control circuit when the change in state of the operable mechanism is sensed by the state change sensing circuit, and outputs the internal server screen information of the requested screen to the display control circuit, and
when the second display process is executed, the display control circuit requests a screen according to internal access information which is designated by the internal server, and displays the screen that is based on the internal server information which is input from the internal server according to the request on the display.

6. The electronic apparatus according to claim 1,
wherein the internal screen information output circuit is a native screen memory section which stores native screen information that is screen information that relates to the screen which is displayed on the display.

7. The electronic apparatus according to claim 6,
wherein when the first display process is executed, the display control circuit receives the server screen information from the external server based on the access information which is designated by the external server, and displays the screen that is based on the server screen information on the display, the display control circuit includes an access information memory section which stores access information which is designated by the external server, and when the change in state of the operable mechanism is sensed by the state change sensing circuit while executing the first display process, the display control circuit stores the latest access information which is designated by the external server in the access information memory section, and thereafter when ending the second display process and resuming the first display process, the display control circuit displays the screen that is based on the server screen information which corresponds to the latest access information which is stored in the access information memory section on the display.

8. The electronic apparatus according to claim 1, wherein the display control circuit includes
   a first control circuit including a first processor configured to execute the first display process, and
   a second control circuit including a second processor configured to execute the second display process.

9. The electronic apparatus according to claim 8, wherein the first control circuit includes a first memory as the memory that stores the internal screen information in advance, and
the second control circuit includes a second memory.

10. The electronic apparatus according to claim 9, wherein
the display control circuit further includes a third memory that is accessible from the first control circuit and the second control circuit.

11. A display control method for an electronic apparatus which is able to communicate with an external server via a network,
    wherein the electronic apparatus includes a communication interface which receives external server screen information from the external server, a printing section which executes printing on a medium, an operable mechanism which accommodates the medium prior to printing and includes a medium accommodating section which is attachable and detachable with respect to a main body of the electronic apparatus, a display which displays a screen, a control device which controls the display state of the display, and a memory which stores internal screen information in advance, the external server screen information being screen information of an operation screen for controlling the electronic apparatus by a user operation, and
    the control device is provided with an internal screen information output circuit that outputs the internal screen information which is screen information that relates to the screen which is displayed on the display, the internal screen information being received from an internal server and not being received from the external server, the display control method comprising:

causing the control device to execute
    a first display step of displaying a first screen that is based on the external server screen information that is received from the external server on the display,
    a second display step of displaying a second screen that is based on the internal screen information which is received from the internal server on the display,
    a state change sensing step of sensing, by a state change sensing circuit, a change in state of the operable mechanism that is caused by an operation of the operable mechanism,
    a switching step of switching, by a display control circuit, from the first display step to the second display step such that the display control circuit ends the first display step to end displaying of the first screen and starts the second display step to display the second screen upon the change in state of the operable mechanism being sensed in the state change sensing step while the first screen is displayed on the display,
    a step of acquiring, by the display control circuit, the internal screen information which relates to a screen according to the aspect of the change in state of the operable mechanism from the internal screen information output circuit, and displaying the second screen that is based on the internal screen information on the display when the second display step is executed according to the execution of the switching step, the internal screen information being screen information of a setting screen for setting an attribute of the medium that is set in the medium accommodating section whose change in state is sensed while executing the first display process.

* * * * *